(12) United States Patent
McMillen

(10) Patent No.: US 10,082,381 B2
(45) Date of Patent: Sep. 25, 2018

(54) SENSOR SYSTEMS INTEGRATED WITH VEHICLE TIRES

(71) Applicant: BeBop Sensors, Inc., Berkeley, CA (US)

(72) Inventor: Keith A. McMillen, Berkeley, CA (US)

(73) Assignee: BeBop Sensors, Inc., Berkeley, CA (US)

(*) Notice: Subject to any disclaimer, the term of this patent is extended or adjusted under 35 U.S.C. 154(b) by 0 days.

(21) Appl. No.: 15/138,802

(22) Filed: Apr. 26, 2016

(65) Prior Publication Data

US 2016/0318356 A1 Nov. 3, 2016

Related U.S. Application Data

(60) Provisional application No. 62/155,366, filed on Apr. 30, 2015.

(51) Int. Cl.
| | |
|---|---|
| G01B 7/06 | (2006.01) |
| B60C 23/06 | (2006.01) |
| B60T 8/172 | (2006.01) |
| G01L 9/00 | (2006.01) |
| G01L 17/00 | (2006.01) |
| G01L 1/18 | (2006.01) |
| G01L 1/22 | (2006.01) |
| G01B 7/16 | (2006.01) |
| B60C 19/00 | (2006.01) |

(52) U.S. Cl.
CPC .............. *G01B 7/06* (2013.01); *B60C 23/064* (2013.01); *B60T 8/1725* (2013.01); *G01B 7/22* (2013.01); *G01L 1/18* (2013.01); *G01L 1/2287* (2013.01); *G01L 9/0002* (2013.01); *G01L 17/005* (2013.01); *B60C 2019/004* (2013.01); *B60T 2210/36* (2013.01); *B60T 2240/03* (2013.01)

(58) Field of Classification Search
CPC .............. B60C 23/064; B60C 23/0488; B60C 23/0493; B60C 2019/004; B60C 23/002; G01B 7/06; G01B 7/22
See application file for complete search history.

(56) References Cited

U.S. PATENT DOCUMENTS

| | | | |
|---|---|---|---|
| 4,294,014 | A | 10/1981 | Baumann et al. |
| 4,438,291 | A | 3/1984 | Eichelberger et al. |

(Continued)

FOREIGN PATENT DOCUMENTS

| | | |
|---|---|---|
| CN | 200980381 (Y) | 11/2007 |
| CN | 201920728 (U) | 8/2011 |

(Continued)

OTHER PUBLICATIONS

U.S. Final Office Action dated Jul. 18, 2016 issued in U.S. Appl. No. 14/727,619.

(Continued)

*Primary Examiner* — Kabir A Timory
(74) *Attorney, Agent, or Firm* — Weaver Austin Villeneuve & Sampson LLP

(57) ABSTRACT

Sensor systems using piezoresistive materials are described that may be integrated with vehicle tires for use in a variety applications such as, for example, tire pressure monitoring, tread wear monitoring, anti-lock braking system control, suspension adjustment and/or control, wheel-drive system control, or road surface determination.

30 Claims, 9 Drawing Sheets

Wheel Turning Left

(56) References Cited

U.S. PATENT DOCUMENTS

| | | |
|---|---|---|
| 4,489,302 A | 12/1984 | Eventoff |
| 4,693,530 A | 9/1987 | Stillie et al. |
| 4,745,301 A | 5/1988 | Michalchik |
| 4,790,968 A | 12/1988 | Ohkawa et al. |
| 4,852,443 A | 8/1989 | Duncan et al. |
| 5,033,291 A | 7/1991 | Podoloff et al. |
| 5,128,880 A | 7/1992 | White |
| 5,131,306 A | 7/1992 | Yamamoto |
| 5,219,292 A | 6/1993 | Dickirson et al. |
| 5,237,520 A | 8/1993 | White |
| 5,288,938 A | 2/1994 | Wheaton |
| 5,316,017 A | 5/1994 | Edwards et al. |
| 5,429,092 A | 7/1995 | Kamei |
| 5,571,973 A | 11/1996 | Taylot |
| 5,578,766 A | 11/1996 | Kondo |
| 5,624,132 A | 4/1997 | Blackburn et al. |
| 5,659,395 A | 8/1997 | Brown et al. |
| 5,695,859 A | 12/1997 | Burgess |
| 5,729,905 A | 3/1998 | Mathiasmeier et al. |
| 5,822,223 A | 10/1998 | Genest |
| 5,866,829 A | 2/1999 | Pecoraro |
| 5,878,359 A | 3/1999 | Takeda |
| 5,943,044 A | 8/1999 | Martinelli et al. |
| 5,989,700 A | 11/1999 | Krivopal |
| 6,029,358 A | 2/2000 | Mathiasmeier et al. |
| 6,032,109 A | 2/2000 | Ritmiller, III |
| 6,049,327 A | 4/2000 | Walker et al. |
| 6,087,930 A * | 7/2000 | Kulka ............... B60C 23/0493 200/61.22 |
| 6,121,869 A | 9/2000 | Burgess |
| 6,141,643 A | 10/2000 | Harmon |
| 6,155,120 A | 12/2000 | Taylor |
| 6,215,055 B1 | 4/2001 | Saravis |
| 6,216,545 B1 | 4/2001 | Taylor |
| 6,304,840 B1 | 10/2001 | Vance et al. |
| 6,331,893 B1 | 12/2001 | Brown et al. |
| 6,360,615 B1 | 3/2002 | Smela |
| 6,486,776 B1 | 11/2002 | Pollack et al. |
| 6,763,320 B2 | 7/2004 | Kimble |
| 6,815,602 B2 | 11/2004 | De Franco |
| 6,822,635 B2 | 11/2004 | Shahoian et al. |
| 6,829,942 B2 | 12/2004 | Yanai et al. |
| 6,964,205 B2 | 11/2005 | Papakostas et al. |
| 7,037,268 B1 | 5/2006 | Sleva et al. |
| 7,066,887 B2 | 6/2006 | Flesch et al. |
| 7,109,068 B2 | 9/2006 | Akram et al. |
| 7,113,856 B2 | 9/2006 | Theiss et al. |
| 7,157,640 B2 | 1/2007 | Baggs |
| 7,302,866 B1 | 12/2007 | Malkin et al. |
| 7,311,009 B2 | 12/2007 | Kotovsky |
| 7,332,670 B2 | 2/2008 | Fujiwara et al. |
| 7,409,256 B2 | 8/2008 | Lin et al. |
| 7,439,465 B2 | 10/2008 | Parkinson |
| 7,493,230 B2 | 2/2009 | Schwartz et al. |
| 7,536,794 B2 | 5/2009 | Hay et al. |
| 7,608,776 B2 | 10/2009 | Ludwig |
| 7,719,007 B2 | 5/2010 | Tompkins et al. |
| 7,754,956 B2 | 7/2010 | Gain |
| 7,780,541 B2 | 8/2010 | Bauer |
| 7,855,718 B2 | 12/2010 | Westerman |
| 7,928,312 B2 | 4/2011 | Sharma |
| 7,984,544 B2 | 7/2011 | Rosenberg |
| 8,109,149 B2 | 2/2012 | Kotovsky |
| 8,117,922 B2 | 2/2012 | Xia et al. |
| 8,120,232 B2 | 2/2012 | Daniel et al. |
| 8,127,623 B2 | 3/2012 | Son et al. |
| 8,161,826 B1 | 4/2012 | Taylor |
| 8,274,485 B2 | 9/2012 | Liu et al. |
| 8,346,684 B2 | 1/2013 | Mirbach et al. |
| 8,368,505 B2 | 2/2013 | Deppiesse et al. |
| 8,448,530 B2 | 5/2013 | Leuenberger et al. |
| 8,479,585 B2 | 7/2013 | Shaw-Klein |
| 8,536,880 B2 | 9/2013 | Philipp |
| 8,571,827 B2 | 10/2013 | Jang et al. |
| 8,680,390 B2 | 3/2014 | McMillen et al. |
| 8,813,579 B2 | 8/2014 | Aufrere |
| 8,857,274 B2 | 10/2014 | Mamigonians |
| 8,884,913 B2 | 11/2014 | Saynac et al. |
| 8,892,051 B2 | 11/2014 | Yi et al. |
| 8,904,876 B2 | 12/2014 | Taylor et al. |
| 8,925,392 B2 | 1/2015 | Esposito et al. |
| 8,925,393 B2 | 1/2015 | Cannard et al. |
| 8,945,328 B2 | 2/2015 | Longinotti-Buitoni et al. |
| 8,947,889 B2 | 2/2015 | Kelley et al. |
| 8,964,205 B2 | 2/2015 | Shimizu |
| 8,970,513 B2 | 3/2015 | Kwon et al. |
| 9,032,804 B2 | 5/2015 | Granado et al. |
| 9,038,482 B2 | 5/2015 | Xia et al. |
| 9,075,404 B2 | 7/2015 | McMillen et al. |
| 9,076,419 B2 | 7/2015 | McMillen et al. |
| 9,112,058 B2 | 8/2015 | Bao et al. |
| 9,164,586 B2 | 10/2015 | Zellers et al. |
| 9,271,665 B2 | 3/2016 | Sarrafzadeh et al. |
| 9,417,693 B2 | 8/2016 | Seth |
| 9,442,614 B2 | 9/2016 | McMillen |
| 9,480,582 B2 | 11/2016 | Lundborg |
| 9,529,433 B2 | 12/2016 | Shankar et al. |
| 9,546,921 B2 | 1/2017 | McMillen et al. |
| 9,652,101 B2 | 5/2017 | McMillen et al. |
| 9,682,856 B2 | 6/2017 | Whitesides et al. |
| 9,696,833 B2 | 7/2017 | McMillen |
| 9,710,060 B2 | 7/2017 | McMillen et al. |
| 9,721,553 B2 | 8/2017 | McMillen et al. |
| 9,753,568 B2 | 9/2017 | McMillen |
| 9,827,996 B2 | 11/2017 | McMillen |
| 9,836,151 B2 | 12/2017 | McMillen |
| 9,863,823 B2 | 1/2018 | McMillen |
| 9,965,076 B2 | 5/2018 | McMillen |
| 2002/0078757 A1 | 6/2002 | Hines et al. |
| 2004/0031180 A1 | 2/2004 | Ivanov |
| 2004/0093746 A1 | 5/2004 | Varsallona |
| 2004/0183648 A1 | 9/2004 | Weber et al. |
| 2004/0189145 A1 | 9/2004 | Pletner et al. |
| 2005/0109095 A1 | 5/2005 | Sinnett |
| 2007/0129776 A1 | 6/2007 | Robins et al. |
| 2007/0151348 A1 | 7/2007 | Zdeblick et al. |
| 2007/0188179 A1 | 8/2007 | Deangelis et al. |
| 2007/0188180 A1 | 8/2007 | Deangelis et al. |
| 2007/0202765 A1 | 8/2007 | Krans et al. |
| 2007/0234888 A1 | 10/2007 | Rotolo de Moraes |
| 2008/0069412 A1 | 3/2008 | Champagne et al. |
| 2008/0158145 A1 | 7/2008 | Westerman |
| 2008/0189827 A1 | 8/2008 | Bauer |
| 2008/0254824 A1 | 10/2008 | Rotolo de Moraes |
| 2009/0049980 A1 | 2/2009 | Sharma |
| 2009/0237374 A1 | 9/2009 | Li et al. |
| 2009/0272197 A1 | 11/2009 | Ridao Granado et al. |
| 2009/0301190 A1 | 12/2009 | Ross, Jr. et al. |
| 2009/0303400 A1 | 12/2009 | Hou et al. |
| 2010/0066572 A1 | 3/2010 | Dietz et al. |
| 2010/0123686 A1 | 5/2010 | Klinghult et al. |
| 2010/0134327 A1 | 6/2010 | Dinh et al. |
| 2010/0149108 A1 | 6/2010 | Hotelling et al. |
| 2010/0179724 A1 | 7/2010 | Weston |
| 2010/0199777 A1* | 8/2010 | Hooper ............... G01L 19/0084 73/721 |
| 2010/0242274 A1 | 9/2010 | Rosenfeld et al. |
| 2010/0274447 A1 | 10/2010 | Stumpf |
| 2010/0286951 A1 | 11/2010 | Danenberg et al. |
| 2010/0292945 A1 | 11/2010 | Reynolds et al. |
| 2010/0315337 A1 | 12/2010 | Ferren et al. |
| 2011/0088535 A1 | 4/2011 | Zarimis |
| 2011/0088536 A1 | 4/2011 | McMillen et al. |
| 2011/0107771 A1 | 5/2011 | Crist et al. |
| 2011/0141052 A1 | 6/2011 | Bernstein et al. |
| 2011/0153261 A1 | 6/2011 | Jang et al. |
| 2011/0221564 A1 | 9/2011 | Deppiesse et al. |
| 2011/0241850 A1 | 10/2011 | Bosch et al. |
| 2011/0246028 A1 | 10/2011 | Lisseman et al. |
| 2011/0260994 A1 | 10/2011 | Saynac et al. |
| 2011/0271772 A1 | 11/2011 | Parks et al. |
| 2011/0279409 A1 | 11/2011 | Salaverry et al. |
| 2012/0007831 A1 | 1/2012 | Chang et al. |
| 2012/0024132 A1 | 2/2012 | Wallace et al. |

(56) References Cited

U.S. PATENT DOCUMENTS

| | | |
|---|---|---|
| 2012/0026124 A1 | 2/2012 | Li et al. |
| 2012/0055257 A1 | 3/2012 | Shaw-Klein |
| 2012/0143092 A1 | 6/2012 | Xia et al. |
| 2012/0191554 A1 | 7/2012 | Xia et al. |
| 2012/0197161 A1 | 8/2012 | Xia et al. |
| 2012/0198949 A1 | 8/2012 | Xia et al. |
| 2012/0222498 A1 | 9/2012 | Mamigonians |
| 2012/0234105 A1 | 9/2012 | Taylor |
| 2012/0283979 A1 | 11/2012 | Bruekers et al. |
| 2012/0296528 A1 | 11/2012 | Wellhoefer et al. |
| 2012/0297885 A1 | 11/2012 | Hou et al. |
| 2012/0299127 A1* | 11/2012 | Fujii ............... B60C 23/0488 257/415 |
| 2012/0312102 A1 | 12/2012 | Alvarez |
| 2012/0323501 A1 | 12/2012 | Sarrafzadeh et al. |
| 2013/0009905 A1 | 1/2013 | Castillo et al. |
| 2013/0055482 A1 | 3/2013 | D'Aprile et al. |
| 2013/0082970 A1 | 4/2013 | Frey et al. |
| 2013/0085394 A1 | 4/2013 | Corbett, III et al. |
| 2013/0113057 A1 | 5/2013 | Taylor |
| 2013/0165809 A1 | 6/2013 | Abir |
| 2013/0192071 A1 | 8/2013 | Esposito et al. |
| 2013/0203201 A1 | 8/2013 | Britton et al. |
| 2013/0211208 A1 | 8/2013 | Varadan et al. |
| 2013/0239787 A1 | 9/2013 | McMillen et al. |
| 2013/0274985 A1 | 10/2013 | Lee et al. |
| 2013/0275057 A1 | 10/2013 | Perlin et al. |
| 2013/0327560 A1 | 12/2013 | Ichiki |
| 2013/0340598 A1 | 12/2013 | Marquez et al. |
| 2014/0007704 A1 | 1/2014 | Granado et al. |
| 2014/0013865 A1 | 1/2014 | White et al. |
| 2014/0026678 A1 | 1/2014 | Cannard et al. |
| 2014/0033829 A1 | 2/2014 | Xia et al. |
| 2014/0090488 A1 | 4/2014 | Taylor et al. |
| 2014/0104776 A1 | 4/2014 | Clayton et al. |
| 2014/0107966 A1 | 4/2014 | Xia et al. |
| 2014/0107967 A1 | 4/2014 | Xia et al. |
| 2014/0107968 A1 | 4/2014 | Xia et al. |
| 2014/0125124 A1 | 5/2014 | Verner |
| 2014/0130593 A1 | 5/2014 | Ciou et al. |
| 2014/0150573 A1 | 6/2014 | Cannard et al. |
| 2014/0182170 A1 | 7/2014 | Wawrousek et al. |
| 2014/0195023 A1 | 7/2014 | Statham et al. |
| 2014/0215684 A1 | 8/2014 | Hardy et al. |
| 2014/0222243 A1 | 8/2014 | McMillen et al. |
| 2014/0318699 A1 | 10/2014 | Longinotti-Buitoni et al. |
| 2014/0347076 A1 | 11/2014 | Barton et al. |
| 2015/0035743 A1 | 2/2015 | Rosener |
| 2015/0084873 A1 | 3/2015 | Hagenbuch et al. |
| 2015/0086955 A1 | 3/2015 | Poniatowski et al. |
| 2015/0130698 A1 | 5/2015 | Burgess |
| 2015/0168238 A1 | 6/2015 | Raut et al. |
| 2015/0177080 A1 | 6/2015 | Esposito et al. |
| 2015/0261372 A1 | 9/2015 | McMillen et al. |
| 2015/0316434 A1 | 11/2015 | McMillen et al. |
| 2015/0317964 A1 | 11/2015 | McMillen et al. |
| 2015/0330855 A1 | 11/2015 | Daniecki et al. |
| 2015/0331512 A1 | 11/2015 | McMillen et al. |
| 2015/0331522 A1 | 11/2015 | McMillen et al. |
| 2015/0331523 A1 | 11/2015 | McMillen et al. |
| 2015/0331524 A1 | 11/2015 | McMillen et al. |
| 2015/0331533 A1 | 11/2015 | McMillen et al. |
| 2015/0370396 A1 | 12/2015 | Hotelling et al. |
| 2016/0054798 A1 | 2/2016 | Messingher et al. |
| 2016/0070347 A1 | 3/2016 | McMillen et al. |
| 2016/0147352 A1 | 5/2016 | Filiz et al. |
| 2016/0169754 A1 | 6/2016 | Kowalewski et al. |
| 2016/0175186 A1 | 6/2016 | Shadduck |
| 2016/0238547 A1 | 8/2016 | Park et al. |
| 2016/0252412 A1 | 9/2016 | McMillen et al. |
| 2016/0270727 A1 | 9/2016 | Berg et al. |
| 2016/0278709 A1 | 9/2016 | Ridao Granado et al. |
| 2016/0318356 A1 | 11/2016 | McMillen et al. |
| 2016/0375910 A1 | 12/2016 | McMillen et al. |
| 2017/0038881 A1 | 2/2017 | McMillen |
| 2017/0110103 A1 | 4/2017 | McMillen et al. |
| 2017/0167931 A1 | 6/2017 | McMillen et al. |
| 2017/0212638 A1 | 7/2017 | McMillen |
| 2017/0303853 A1 | 10/2017 | McMillen et al. |
| 2017/0305301 A1 | 10/2017 | McMillen et al. |
| 2018/0015932 A1 | 1/2018 | McMillen et al. |
| 2018/0094991 A1 | 4/2018 | McMillen et al. |

FOREIGN PATENT DOCUMENTS

| | | |
|---|---|---|
| CN | 102551728 (A) | 7/2012 |
| CN | 202396601 (U) | 8/2012 |
| CN | 203234132 (U) | 10/2013 |
| CN | 102406280 (B) | 3/2014 |
| DE | 102 12 023 A1 | 10/2003 |
| DE | 11 2010 004 038 T5 | 9/2012 |
| EP | 0 014 022 B1 | 11/1984 |
| EP | 2 682 724 A1 | 1/2014 |
| JP | H08-194481 (A) | 7/1996 |
| JP | 2000-267664 (A) | 9/2000 |
| JP | 2008-515008 (A) | 5/2008 |
| KR | 10-2007-0008500 (A) | 1/2007 |
| KR | 100865148 B1 | 10/2008 |
| KR | 10-1362742 B1 | 2/2014 |
| KR | 10-2014-0071693 A | 6/2014 |
| NL | 8900820 A | 11/1990 |
| RU | 2 533 539 (C1) | 11/2014 |
| WO | WO 99/020179 A1 | 4/1999 |
| WO | WO 2007/024875 A2 | 3/2007 |
| WO | WO 2009/155891 A1 | 12/2009 |
| WO | WO 2011/047171 A2 | 4/2011 |
| WO | PCT/US15/58370 | 10/2015 |
| WO | WO 2015/175317 A1 | 11/2015 |
| WO | PCT/US16/19513 | 2/2016 |
| WO | WO 2016/070078 A1 | 5/2016 |
| WO | WO 2016/138234 A1 | 9/2016 |
| WO | WO 2016/176307 A1 | 11/2016 |
| WO | WO 2016/210173 A1 | 12/2016 |
| WO | WO 2017/066096 A1 | 4/2017 |
| WO | WO 2017/184367 A1 | 10/2017 |

OTHER PUBLICATIONS

U.S. Notice of Allowance dated Sep. 15, 2016 issued in U.S. Appl. No. 14/727,619.
U.S. Office Action dated Jun. 22, 2016 issued in U.S. Appl. No. 14/728,872.
U.S. Final Office Action dated Oct. 18, 2016 issued in U.S. Appl. No. 14/728,872.
U.S. Advisory Action dated Feb. 10, 2017 issued in U.S. Appl. No. 14/728,872.
U.S. Office Action dated May 19, 2017 issued in U.S. Appl. No. 14/728,872.
U.S. Office Action dated Jul. 25, 2016 issued in U.S. Appl. No. 14/728,873.
U.S. Office Action dated Dec. 30, 2016 issued in U.S. Appl. No. 14/728,873.
U.S. Final Office Action dated Mar. 31, 2017 issued in U.S. Appl. No. 14/728,873.
U.S. Advisory Action and Examiner initiated interview summary dated May 26, 2017 issued in U.S. Appl. No. 14/728,873.
U.S. Final Office Action dated Jul. 6, 2016 issued in U.S. Appl. No. 14/299,976.
U.S. Office Action dated Oct. 21, 2016 issued in U.S. Appl. No. 14/299,976.
U.S. Final Office Action dated Apr. 19, 2017 issued in U.S. Appl. No. 14/299,976.
U.S. Final Office Action dated Jun. 8, 2017 issued in U.S. Appl. No. 14/299,976.
U.S. Notice of Allowance dated Jun. 23, 2016 issued in U.S. Appl. No. 14/464,551.
U.S. Office Action dated Sep. 23, 2016 issued in U.S. Appl. No. 14/800,538.

(56) References Cited

OTHER PUBLICATIONS

U.S. Notice of Allowance dated Jan. 17, 2017 issued in U.S. Appl. No. 14/800,538.
U.S. Office Action dated Feb. 22, 2017 issued in U.S. Appl. No. 14/671,821.
U.S. Notice of Allowance dated Jul. 3, 2017 issued in U.S. Appl. No. 14/671,821.
U.S. Office Action dated Jun. 30, 2017 issued in U.S. Appl. No. 15/251,772.
U.S. Office Action dated Jun. 28, 2016 issued in U.S. Appl. No. 14/671,844.
U.S. Final Office Action dated Nov. 25, 2016 issued in U.S. Appl. No. 14/671,844.
U.S. Notice of Allowance dated Mar. 13, 2017 issued in U.S. Appl. No. 14/671,844.
U.S. Office Action dated Jan. 26, 2017 issued in U.S. Appl. No. 15/052,293.
U.S. Final Office Action dated May 2, 2017 issued in U.S. Appl. No. 15/052,293.
U.S. Notice of Allowance dated May 24, 2017 issued in U.S. Appl. No. 15/052,293.
U.S. Notice of Allowance [Supplemental Notice of Allowability] dated Jun. 20, 2017 issued in U.S. Appl. No. 15/052,293.
U.S. Office Action dated May 20, 2016 issued in U.S. Appl. No. 14/928,058.
U.S. Final Office Action dated Jan. 6, 2017 issued in U.S. Appl. No. 14/928,058.
U.S. Notice of Allowance dated Mar. 16, 2017 issued in U.S. Appl. No. 14/928,058.
U.S. Office Action dated Jun. 23, 2017 issued in U.S. Appl. No. 15/190,089.
U.S. Office Action dated Dec. 27, 2016 issued in U.S. Appl. No. 15/287,520.
U.S. Notice of Allowance dated Mar. 27, 2017 issued in U.S. Appl. No. 15/287,520.
PCT International Preliminary Report on Patentability and Written Opinion dated Nov. 24, 2016 issued in PCT/US2015/029732.
PCT International Search Report and Written Opinion dated May 26, 2016 issued in PCT/US2016/019513.
PCT International Search Report and Written Opinion dated Apr. 14, 2016 issued in PCT/US2015/058370.
PCT International Preliminary Report on Patentability and Written Opinion dated May 11, 2017 issued in PCT/US2015/058370.
PCT International Search Report and Written Opinion dated Sep. 15, 2016 issued in PCT/US2016/029528.
PCT International Search Report and Written Opinion dated Sep. 29, 2016 issued in PCT/US2016/039089.
PCT International Search Report and Written Opinion dated Jan. 19, 2017 issued in PCT/US2016/055997.
U.S. Appl. No. 15/479,103, filed Apr. 4, 2017, McMillen et al.
U.S. Appl. No. 15/621,935, filed Jun. 13, 2017, McMillen et al.
U.S. Appl. No. 15/630,840, filed Jun. 22, 2017, McMillen et al.
U.S. Appl. No. 15/052,293, filed Feb. 24, 2016, McMillen et al.
U.S. Office Action dated Sep. 12, 2012 issued in U.S. Appl. No. 12/904,657.
U.S. Office Action dated Apr. 15, 2013 issued in U.S. Appl. No. 12/904,657.
U.S. Notice of Allowance dated Nov. 8, 2013 issued in U.S. Appl. No. 12/904,657.
U.S. Office Action dated Mar. 12, 2015 issued in U.S. Appl. No. 14/173,617.
U.S. Notice of Allowance dated May 1, 2015 issued in U.S. Appl. No. 14/173,617.
U.S. Office Action dated Mar. 10, 2016 issued in U.S. Appl. No. 14/727,619.
U.S. Office Action dated Apr. 2, 2015 issued in U.S. Appl. No. 13/799,304.
U.S. Notice of Allowance dated Apr. 24, 2015 issued in U.S. Appl. No. 13/799,304.
U.S. Office Action dated Sep. 1, 2015 issued in U.S. Appl. No. 14/728,872.
U.S. Final Office Action dated Mar. 9, 2016 issued in U.S. Appl. No. 14/728,872.
U.S. Office Action dated Mar. 9, 2016 issued in U.S. Appl. No. 14/299,976.
U.S. Office Action dated Jan. 13, 2016 issued in U.S. Appl. No. 14/464,551.
PCT International Search Report dated May 27, 2011, issued in PCT/US2010/052701.
PCT International Preliminary Report on Patentability and Written Opinion dated Apr. 26, 2012, issued in PCT/US2010/052701.
Japanese Office Action dated Feb. 25, 2014 issued in JP 2012-534361.
PCT International Search Report and Written Opinion dated Sep. 3, 2015 issued in PCT/US2015/029732.
"Electronic Foot Size Measuring Devices," *Sensatech Research LTD., Custom Electronic Sensing Solutions*, Registered Office: 4 Heath Square, Boltro Road, Haywards Heath, RH16 1BL Company Registration No. 4524018 Cardiff [retrieved at http:www.electronicsarena.co.uk/companies/sensatech-research/products/electronic-foot-size-measureing-devices on Sep. 17, 2015], 3 pages.
"IStep® Digital Foot Scan," (©2002-2015) [retrieved at http://www.foot.com/site/iStep on Sep. 17, 2015], 1 page.
"Podotech Elftman," and Podotech Elftman Brochure (UK Version) [retrieved at http://www.podotech.com/diagnostics/podotech-elftman-2/ on Sep. 17, 2015] podo+tech®, Foot Care Technology Solutions, 7 pages.
Roh, Jung-Sim et al. (2011) "Robust and reliable fabric and piezoresistive multitouch sensing surfaces for musical controllers," from Alexander Refsum Jensenius, Recorded at: *11th International Conference on New Interfaces for Musical Expression* May 30-Jun. 1, 2011, Oslo, Norway, a vimeo download at http://vimeo.com/26906580.
"The Emed®-Systems," [retrieved at http://www.novel.de/novelcontent/emed on Sep. 17, 2015] novel.de, 4 pages.
U.S. Notice of Allowance dated Oct. 16, 2017 issued in U.S. Appl. No. 14/728,872.
U.S. Office Action dated Aug. 25, 2017 issued in U.S. Appl. No. 14/728,873.
U.S. Office Action dated Sep. 1, 2017 issued in U.S. Appl. No. 14/299,976.
U.S. Final Office Action dated Nov. 15, 2017 issued in U.S. Appl. No. 15/251,772.
U.S. Notice of Allowance dated Sep. 22, 2017 issued in U.S. Appl. No. 15/052,293.
U.S. Notice of Allowance [Supplemental Notice of Allowability] dated Oct. 19, 2017 issued in U.S. Appl. No. 15/052,293.
U.S. Notice of Allowance dated Aug. 10, 2017 issued in U.S. Appl. No. 15/190,089.
PCT International Preliminary Report on Patentability and Written Opinion dated Sep. 8, 2017 issued in PCT/US2016/019513.
PCT International Preliminary Report on Patentability and Written Opinion dated Oct. 31, 2017 issued in PCT/US2016/029528.
PCT International Search Report and Written Opinion dated Aug. 14, 2017 issued in PCT/US2017/026812.
U.S. Appl. No. 15/690,108, filed Aug. 29, 2017, McMillen et al.
U.S. Final Office Action dated Dec. 22, 2017 issued in U.S. Appl. No. 14/728,873.
U.S. Office Action dated Mar. 26, 2018 issued in U.S. Appl. No. 14/728,873.
U.S. Notice of Allowance dated Feb. 22, 2018 issued in U.S. Appl. No. 14/299,976.
PCT International Preliminary Report on Patentability and Written Opinion dated Dec. 26, 2017 issued in PCT/US2016/039089.
U.S. Appl. No. 15/835,131, filed Dec. 7, 2017, McMillen et al.
U.S. Office Action dated Feb. 22, 2018 issued in U.S. Appl. No. 15/251,772.
PCT International Preliminary Report on Patentability and Written Opinion dated Apr. 26, 2018 issued in PCT/US2016/055997.

* cited by examiner

STATIC  ACCELERATION
 BRAKING  RIGHT TURN

SENSOR SYSTEMS INTEGRATED WITH VEHICLE TIRES

RELATED APPLICATION DATA

The present application is a non-provisional of and claims priority under 35 U.S.C. 119(e) to U.S. Provisional Patent Application No. 62/155,366 entitled Sensor Systems Integrated with Vehicle Tires filed on Apr. 30, 2015, the entire disclosure of which is incorporated herein by reference for all purposes.

BACKGROUND

Demand is rapidly rising for technologies that bridge the gap between computing devices and the physical world. These interfaces typically require some form of sensor technology that translates information from the physical domain to the digital domain. The "Internet of Things" contemplates the use of sensors in a virtually limitless range of applications, for many of which conventional sensor technology is not well suited.

SUMMARY

According to various implementations, sensors and applications of sensors are provided for use with vehicle tires. According to a particular class of implementations, a sensor system includes a flexible piezoresistive substrate and an array of sensors. Each sensor includes at least two conductive traces formed directly on the piezoresistive substrate. Each sensor is positioned on the substrate to align with a region of the vehicle tire. Resistance between the conductive traces varies with force applied to the piezoresistive substrate. The sensor system includes sensor circuitry configured to receive sensor signals from the array of sensors. Each sensor signal represents a force associated with a corresponding one of the sensors. The sensor system is configured to conform to an interior of the vehicle tire.

According to a specific implementation, the sensor circuitry is configured to generate control information from the sensor signals. The control information is for use by a tire pressure monitoring system, a tread wear monitoring system, an anti-lock braking system, a suspension adjustment and/or control system, a wheel-drive system, or a road surface determination system.

According to a specific implementation, a vehicle tire includes the sensor system. According to a more specific implementation, the vehicle tire includes a plurality of layers, a first one of the layers including the piezoresistive substrate and sensor array. According to another more specific implementation, a mounting platform is integrated with an inner surface of the tire during vulcanization of the tire. The sensor system is mounted on the mounting platform after vulcanization of the tire.

According to another class of implementations, a sensor system, includes piezoresistive material, a dielectric substrate aligned and in contact with the piezoresistive material, and an array of sensors. Each sensor includes at least two conductive traces formed directly on the dielectric substrate such that the conductive traces are in contact with the piezoresistive material. Each sensor being positioned on the dielectric substrate to align with a region of the vehicle tire. Resistance between the conductive traces varies with force applied to the piezoresistive material. Sensor circuitry is configured to receive sensor signals from the array of sensors. Each sensor signal represents a force associated with a corresponding one of the sensors. The sensor system is configured to conform to an interior of the vehicle tire.

According to a specific implementation, the piezoresistive material is a continuous flexible substrate. According to another specific implementation, the piezoresistive material is a plurality of patches of piezoresistive material. Each patch of the piezoresistive material is aligned with one or more of the sensors.

According to another class of implementations, a method is provided for determining locations of each of a plurality of tires on a vehicle. Turn data are received representing a plurality of right and left turns of the vehicle. Tire sensor data are received for each of the tires of the vehicle. The tire sensor data represent forces at a contact patch for the corresponding tire. A tire location on the vehicle is determined for each of the tires with reference to the turn data and the tire sensor data.

According to a specific implementation, determining the tire location for each of the tires includes correlating first portions of the tire sensor data for each of the tires with one or more turns represented in the turn data, and comparing the first portions of the tire sensor data for a first subset of the tires to determine which of the first subset of tires are on a left side of the vehicle and which of the first subset of tires are on a right side of the vehicle.

According to a more specific implementation, the first portions of the tire sensor data for each of the tires represent a slip angle for the corresponding tire. Comparing the first portions of the tire sensor data for the first subset of tires includes comparing the slip angles for the first subset of tires.

According to another more specific implementation, the first portions of the tire sensor data for each of the tires represent at least some of the forces at the contact patch for the corresponding tire. Comparing the first portions of the tire sensor data for the first subset of tires includes comparing the forces represented in the first portions of the tire sensor data.

According to another more specific implementation, The first portions of the tire sensor data for a second subset of the tires are compared to determine which of the second subset of tires are front tires and which of the second subset of tires are rear tires. According to an even more specific implementation, the first portions of the tire sensor data for each of the tires represent a slip angle for the corresponding tire. Comparing the first portions of the tire sensor data for the second subset of tires includes comparing the slip angles for the second subset of tires. According to another more specific implementation, the first portions of the tire sensor data for each of the tires represent at least some of the forces at the contact patch for the corresponding tire. Comparing the first portions of the tire sensor data for the second subset of tires includes comparing the forces represented in the first portions of the tire sensor data.

According to another more specific implementation, accelerometer data from each of the tires are compared to determine an ordering of the tires from a front to a back of the vehicle.

According to another more specific implementation, determining the tire location for each of the tires includes correlating second portions of the tire sensor data for each of the tires with one or more acceleration events, and comparing the second portions of the tire sensor data for a second subset of the tires to determine which of the second subset of tires are front tires and which of the second subset of tires are rear tires.

According to a specific implementation, the tire sensor data are associated with the corresponding tire with reference to a device identifier associated with a tire sensor system integrated with the corresponding tire.

According to a specific implementation, determining the tire location for each of the tires includes correlating first portions of the tire sensor data for each of the tires with one or more acceleration events, and comparing the first portions of the tire sensor data for a first subset of the tires to determine which of the first subset of tires are front tires and which of the first subset of tires are rear tires. According to an even more specific implementation, rotational speeds of the tires are correlated with one or more turns represented in the turn data. The rotational speeds of a second subset of the tires for one or more of the turns are compared to determine which of the second subset of tires are on a left side of the vehicle and which of the second subset of tires are on a right side of the vehicle.

According to a specific implementation, at least some of the tires of the vehicle are arranged as pairs on a same axle and on a same side of the vehicle. Each pair of tires has an inside tire and an outside tire. Determining the tire location for each of the tires includes comparing apparent directions of rotation of the tires in each pair of tires to determine which of the tires in each pair of tires is the inside tire and which is the outside tire.

A further understanding of the nature and advantages of various implementations may be realized by reference to the remaining portions of the specification and the drawings.

DETAILED DESCRIPTION

Figure 1:
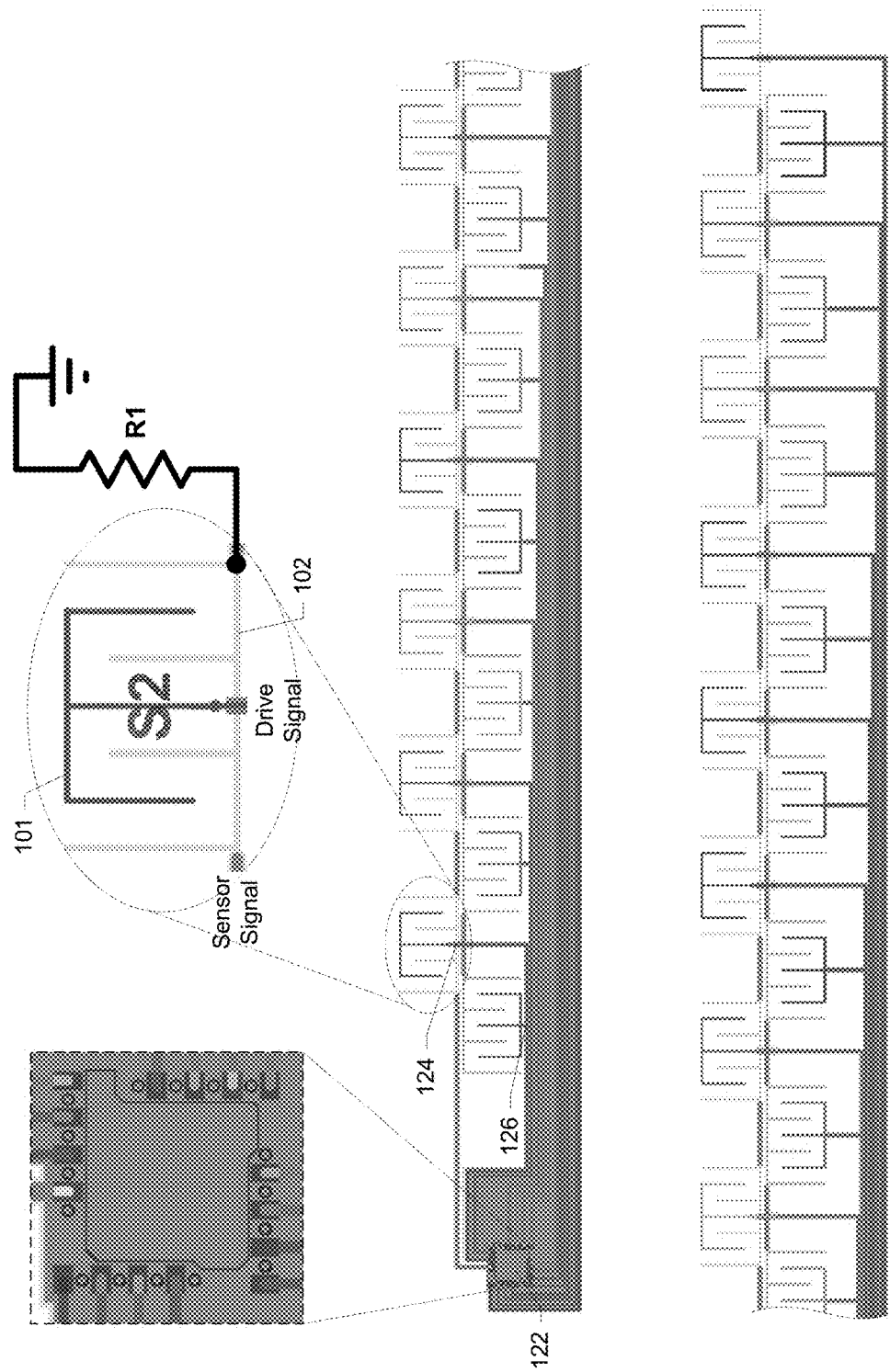
FIG. 1 shows a particular implementation of vehicle tire sensor system.

Sensors and sensor systems incorporating piezoresistive materials are described in this disclosure. In particular, sensor systems for integration with vehicle tires are described. Specific implementations are described herein including the best modes contemplated. Examples of these implementations are illustrated in the accompanying drawings. However, the scope of this disclosure is not limited to the described implementations. Rather, this disclosure is intended to cover alternatives, modifications, and equivalents of these implementations. In the following description, specific details are set forth in order to provide a thorough understanding of the described implementations. Some implementations may be practiced without some or all of these specific details. In addition, well known features may not have been described in detail to promote clarity.

Piezoresistive materials include any of a class of materials that exhibit a change in electrical resistance in response to mechanical force (e.g., pressure, impact, distortion, etc.) applied to the material. One class of sensors described herein includes conductive traces formed directly on or otherwise integrated with a flexible substrate of piezoresistive material, e.g., a piezoresistive fabric or other flexible material. Another class of sensors described herein includes conductive traces formed directly on or otherwise integrated with a flexible dielectric substrate with flexible piezoresistive material that is adjacent and/or tightly integrated with the dielectric substrate and in contact with (or in some cases held slightly off of) portions of the traces. When force is applied to such a sensor, the resistance between traces connected by the piezoresistive material changes in a time-varying manner that is representative of the applied force. A signal representative of the magnitude of the applied force is generated based on the change in resistance. This signal is captured via the conductive traces (e.g., as a voltage or a current), digitized (e.g., via an analog-to-digital converter), processed (e.g., by an associated processor, controller, or suitable control circuitry), and potentially mapped (e.g., by the associated processor, controller, or control circuitry) to a control function that may be used in conjunction with virtually any type of process, device, or system. It should be noted that the output signals from such sensors may also be used to detect a variety of distortions and/or deformations of the substrate(s) on which they are formed or with which they are integrated such as, for example, bends, stretches, torsions, rotations, etc. In addition, arrays of sensors having various configurations are described in this disclosure.

Printing, screening, depositing, thermally transferring, or otherwise forming conductive traces directly on flexible substrates allows for the creation of a sensor or sensor array that fits any arbitrary shape or volume. The piezoresistive material on which the traces are formed or with which the traces are in contact may be any of a variety of woven and non-woven fabrics having piezoresistive properties. Implementations are also contemplated in which the piezoresistive material may be any of a variety of flexible, stretchable, or otherwise deformable materials (e.g., rubber, or a stretchable fabric such as spandex or open mesh fabrics) having piezoresistive properties. The conductive traces may be formed on the piezoresistive material or a flexible dielectric substrate using any of a variety of conductive inks or paints. More generally, implementations are contemplated in which the conductive traces are formed using any flexible conductive material that may be formed on a flexible substrate. It should be understood with reference to the foregoing that, while specific implementations are described with reference to specific materials and techniques, the scope of this disclosure is not so limited.

Both one-sided and two-side implementations are contemplated, e.g., conductive traces can be printed or formed on one or both sides of a flexible substrate. As will be understood, two-sided implementations may require some mechanism for connecting conductive traces on one side of the substrate to those on the other side. Some implementations use vias in which conductive ink or paint is flowed through the vias to establish the connections. Alternatively, conductive vias or rivets may make connections through the flexible substrate. Both single and double-sided implementations may also use insulating materials formed over or under conductive traces. This allows for the stacking or layering of conductive traces and signal lines, e.g., to allow the routing of signal line to isolated structures in a manner analogous to the different layers of a printed circuit board.

Routing of signals on and off the flexible substrate may be achieved in a variety of ways. For example, some implementations might use elastomeric connectors (e.g., ZEBRA® connectors) which alternate conductive and non-conductive rubber at a density typically an order of magnitude greater than the width of the conductive traces to which they connect (e.g., at the edge of the substrate). Alternatively, a circuit board (possibly made of a flexible material such as Kapton), or a bundle of conductors may be riveted or otherwise secured to the substrate. The use of rivets may also provide mechanical reinforcement to the connection.

According to some implementations, matching conductive traces or pads on the flexible substrate and a circuit board can be secured to each other using, for example, a layer of conductive adhesive (e.g., a conductive epoxy such as Masterbond EP79 from Masterbond, Inc. of Hackensack, N.J.) applied to one or both of the surfaces which are then mated to each other. The conductive traces or pads can also be held together with additional mechanical elements such as sonic welds or rivets. If conductive rivets are used to make the electrical connections to the conductive traces of the flexible substrate, the conductive adhesive may not be required. Conductive threads may also be used to connect the conductive traces of the flexible substrate to an external assembly. The wide range of variations within the scope of this disclosure will be apparent to those of skill in the art.

According to a particular class of implementations, the piezoresistive material is a pressure sensitive fabric manufactured by Eeonyx, Inc., of Pinole, Calif. The fabric includes conductive particles that are polymerized to keep them suspended in the fabric. The base material is a polyester felt selected for uniformity in density and thickness as this promotes greater uniformity in conductivity of the finished piezoresistive fabric. That is, the mechanical uniformity of the base material results in a more even distribution of conductive particles when the slurry containing the conductive particles is introduced. The fabric may be woven. Alternatively, the fabric may be non-woven such as, for example, a calendared fabric, e.g., fibers bonded together by chemical, mechanical, heat, or solvent treatment. For implementations in which conductive traces are formed on the piezoresistive fabric, calendared material may present a smooth outer surface which promotes more accurate screening of conductive inks.

The conductive particles in the fabric may be any of a wide variety of materials including, for example, silver, copper, gold, aluminum, carbon, etc. Some implementations may employ carbon graphenes that are formed to grip the fabric. Such materials may be fabricated using techniques described in U.S. Pat. No. 7,468,332 for Electroconductive Woven and Non-Woven Fabric issued on Dec. 23, 2008, the entire disclosure of which is incorporated herein by reference for all purposes. However, it should again be noted that any of a wide variety of flexible materials that exhibit a change in resistance or conductivity when force is applied to the material may be suitable for implementation of sensors as described herein.

According to a particular class of implementations, conductive traces having varying levels of conductivity are formed on flexible piezoresistive material or a flexible dielectric substrate using conductive silicone-based inks manufactured by, for example, E.I. du Pont de Nemours and Company (DuPont) of Wilmington, Del., and/or Creative Materials of Ayer, Mass. An example of a conductive ink suitable for implementing highly conductive traces for use with various implementations is product number 125-19 from Creative Materials, a flexible, high temperature, electrically conductive ink. Examples of conductive inks for implementing lower conductivity traces for use with various implementations are product numbers 7102 and 7105 from DuPont, both carbon conductive compositions. Examples of dielectric materials suitable for implementing insulators for use with various implementations are product numbers 5018 and 5036 from DuPont, a UV curable dielectric and an encapsulant, respectively. These inks are flexible and durable and can handle creasing, washing, etc. The degree of conductivity for different traces and applications is controlled by the amount or concentration of conductive particles (e.g., silver, copper, aluminum, carbon, etc.) suspended in the silicone. These inks can be screen printed or printed from an inkjet printer. Another class of implementations uses conductive paints (e.g., carbon particles mixed with paint) such as those that are commonly used for EMI shielding and ESD protection.

Additional examples of sensors and arrays of sensors that may be used with various implementations enabled by the present disclosure are described in U.S. Patent Publication No. 2015/0331522 entitled Piezoresistive Sensors and Applications filed on Jun. 9, 2014, and U.S. Patent Publication No. US 2015/0331523 entitled Two-Dimensional Sensor Arrays filed on Aug. 20, 2014, the entire disclosures of both of which are incorporated herein by reference for all purposes. However, it should also be noted that implementations are contemplated that employ a variety of other suitable sensor technologies.

According to a particular class of implementations, a vehicle tire sensor system is provided. FIG. 1 is an illustration of an example of such a sensor system that may be incorporated in a vehicle tire. The depicted tire sensor system includes 28 sensors that capture data at different locations along a section of a tire with which it is integrated or against which it is positioned. For example, the sensor system could be integrated with or otherwise aligned with the interior of a tire extending between the tire beads, i.e., the longitudinal axis of the depicted array of sensors is substantially perpendicular to the direction of rotation of the tire. Alternatively, the sensor system could extend in the direction of tire rotation. Moreover, multiple instances of such a system could be integrated with the tire at various locations and with various orientations.

To fit in the same drawing, the sensor system in FIG. 1 is shown divided into two sections with the lower section being a continuation of the upper section as indicated by the wavy dashed line. In this example, the sensors are implemented with conductive trace patterns that are formed directly on or otherwise integrated with a flexible piezoresistive material. However, as mentioned above, implementations are contemplated in which conductive trace patterns are formed on an adjacent, flexible dielectric substrate.

Portions of the conductive traces that are not intended to be part of a sensor (e.g., signal routing traces) may be shielded or insulated from the piezoresistive material to reduce any unwanted contributions to the sensor signals. That is, the portions of the conductive traces that bring the drive and sense signals to and from the sensors may be insulated from the piezoresistive material using, for example, a dielectric or non-conducting material (shaded portion of the array) that is formed on the piezoresistive material before the conductive traces. Portions of the conductive traces are then formed over the insulating material.

In the depicted implementation there are 28 sensors, S1-S28. Each of the sensors includes two adjacent traces, the respective patterns of which each include extensions that alternate with the extensions of the other. See, for example, the magnified view of sensor S2. As will be appreciated, a wide variety of trace patterns having various geometries, numbers of traces, and spacings are contemplated. One of the traces 101 receives a drive signal; the other trace 102 transmits the sensor signal to associated sensor circuitry (e.g., on PCB 122). The drive signal might be provided, for example, by connecting the trace (permanently or temporarily) to a voltage reference, a signal source that may include additional information in the drive signal, a GPIO (General Purpose Input Output) pin of an associated processor or controller, etc. And as shown in the example in FIG. 1, the sensor signal might be generated using a voltage divider in which one of the resistors of the divider includes the resistance between the two traces of the sensor through the intervening piezoresistive material. The other resistor (represented by R1) might be included, for example, with the associated sensor circuitry. As the resistance of the piezoresistive material changes with applied force or pressure, the sensor signal also varies as a divided portion of the drive signal.

The sensors are energized (via the drive signals) and interrogated (via the sensor signals) to generate an output signal and/or output data for each that is a representation of the amount of force exerted on that sensor. As will also be appreciated, and depending on the application, implementations are contemplated having more or fewer sensors, and in which the arrangement of the sensors may vary.

According to various implementations, different sets of sensors may be selectively energized and interrogated, potentially reducing the number and overall area of traces on the substrate, as well as the required connections to sensor circuitry on an associated PCB (e.g., PCB 122). For example, in the sensor system of FIG. 1, the 28 sensors are driven via 14 drive signal outputs from the sensor circuitry (not shown) on PCB 122, and the sensor signals are received via 2 sensor signal inputs to the sensor circuitry on PCB 122; with 16 connections between the substrate and the PCB as shown in the magnified view of PCB 122. The set of sensors providing sensor signals to one of the 2 sensor signal inputs (e.g., the even numbered sensors or the odd numbered sensors) may be energized in any suitable sequence or pattern such that any signal received on the corresponding sensor signal input can be correlated with the corresponding sensor drive signal by the sensor circuitry.

And because the sensor signals in this implementation are received by the sensor circuitry via two different sensor signal inputs, two sensors can be simultaneously energized as long as they are connected to different sensor signal inputs to the sensor circuitry. This allows for the sharing of drive signal lines. For example, in the implementation of FIG. 1, 14 pairs of sensors share a common drive signal line, i.e., S1 and S2, S3 and S4, S5 and S6, etc. The sharing of the common drive signal lines is enabled by insulators which allow the conductive traces to cross (e.g., as illustrated at 124), as well as locations at which the conductive traces simply diverge (e.g., as illustrated at 126). Other suitable variations on this theme will be understood by those of skill in the art to be within the scope of this disclosure.

According to some implementations, PCB 122 may be connected to the conductive traces of the sensor array as described U.S. Patent Publication No. 2015/0331533 entitled Flexible Sensors and Applications filed on Mar. 27, 2015, the entire disclosure of which is incorporated herein by reference for all purposes. According to other implementations, any of a variety of techniques may be employed to make such a connection including, for example, elastomeric connectors (e.g., ZEBRA® connectors) which alternate conductive and non-conductive rubber at a density typically an order of magnitude greater than the width of the conductive traces to which they connect (e.g., at the edge of the fabric). A variety of other suitable alternatives are available to those of skill in the art.

According to some implementations, the sensor trace patterns, signal routing traces, and insulators of the sensor array are screen printed on a substrate which may be, for example, a flexible PET (polyethylene terephthalate) substrate. For such implementations, the piezoresistive material may be a continuous layer of material or isolated piezoresistive "patches" of material aligned with individual sensors or groups of sensors. These patches may have shapes that are suitable for a given sensor trace pattern or an arrangement of the corresponding group of sensors. According to a particular implementation, the piezoresistive patches (or the continuous piezoresistive substrate) are adhered to an opposing substrate which may be, for example, a non-permeable, flexible material such as, for example, a thermally transferable polyurethane or TPU, such as those available from Bemis Associates Inc. of Shirley, Mass. The piezoresistive patches may be adhered to the TPU by selective heating or using a suitable adhesive, e.g., a dot of glue. In another example, the piezoresistive patches could be punched with an adhesive on the back (e.g., a pressure sensitive adhesive such as 3M 468MP commonly referred to as double sided tape). Alternatively, the substrate with the piezoresistive patches could be a PET substrate with pressure sensitive adhesive applied to one surface for adhering to the piezoresistive patches and then for adhering to the substrate with the sensor traces.

The substrate with the piezoresistive patches is positioned relative to the other substrate so the patches are aligned with the corresponding sensor trace patterns. The substrates are then thermally pressed together so one substrate melts into the other (at least for implementations in which one substrate is a TPU), forming a hermetic seal around each of the sensors (i.e., the piezoresistive patch and its corresponding trace pattern), as well as around the routing traces leading to sensor circuitry. Alternatively, a seal may be formed using adhesives between two PET substrates. The seal provides environmental protection for the sensors and traces and helps hold the individual sensor components in position resulting in a robust and tightly integrated unit. For implementations having a continuous piezoresistive substrate and/or in which the sensors are formed on the piezoresistive substrate, the piezoresistive material can be sandwiched between PET and TPU substrates or between two PET substrates to provide such environmental protection.

Environmental protection can be particular advantageous for the conductive inks from which the sensors and traces are constructed given their tendency to oxidize and degrade over time when exposed to various environmental contaminants. Such a construction may be useful in protecting the sensor array from environmental conditions and shear forces, but may also enable a wide dynamic range of operation for each of the sensors depending on the thickness and/or rigidity of the materials selected. The choice and arrangement of materials may be dictated by the type of tire, its size, and expected life span. For example, truck tires are expected to last 300K-500K miles, so more rigorous construction methods with a relatively thick PET substrate and robust TPU encapsulation might be called for. Alternatively, for tires only expected to last 50K miles, a more lightweight construction may be appropriate. Variations on this theme will be apparent to those of skill in the art.

Figure 2:
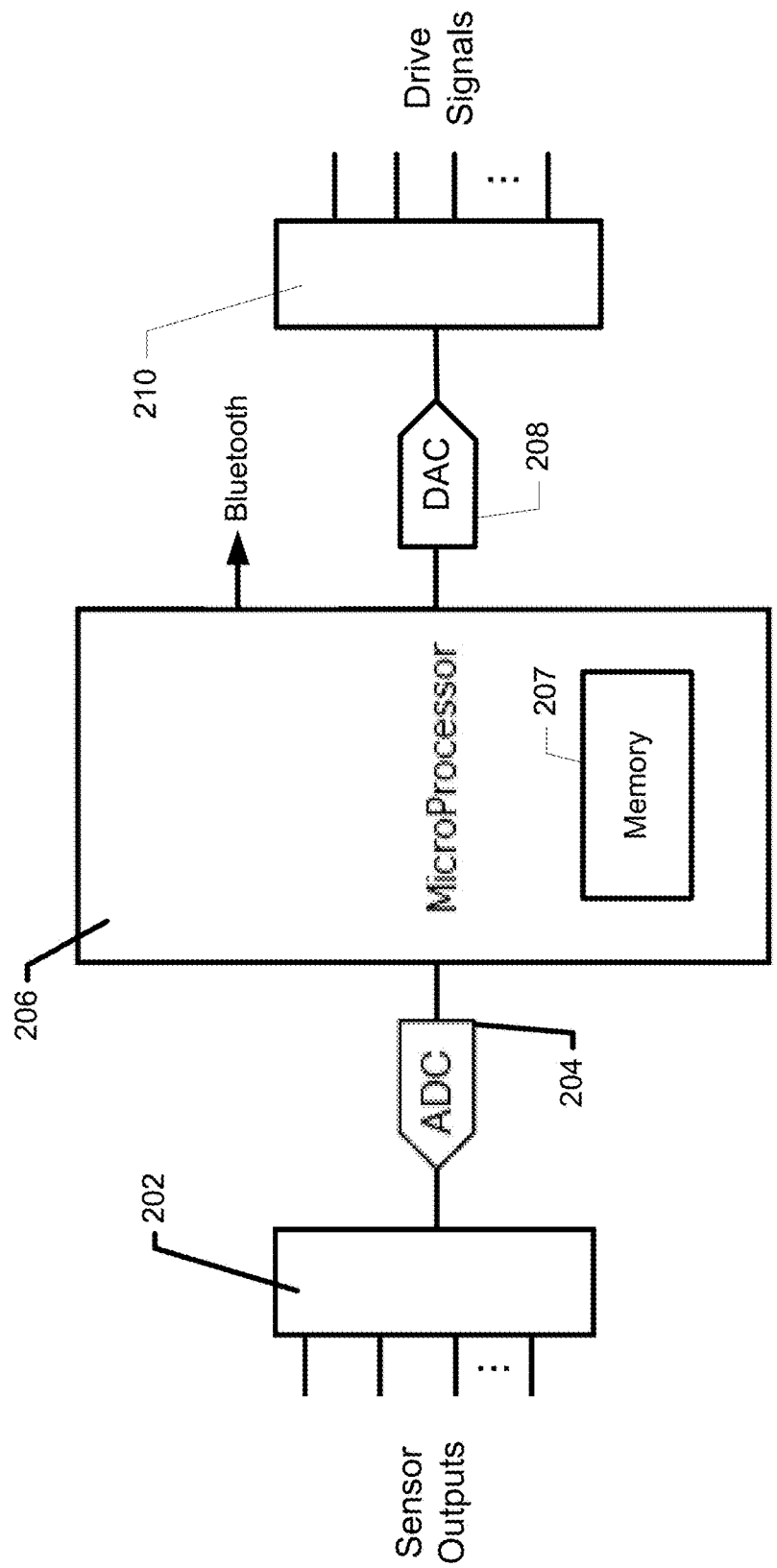
FIG. 2 is a simplified block diagram of sensor circuitry suitable for use with various implementations.

FIG. 2 is a simplified diagram of sensor circuitry that may be provided on a PCB for use with implementations described herein. For example, in the implementation described above with reference to FIG. 1, such sensor circuitry could be provided on PCB 122 and connected to the conductive traces associated with sensors S1-S28. When pressure is applied to one of the sensors, a resulting signal (captured via the corresponding traces) is received and digitized (e.g., via multiplexer 202 and A-D converter 204) and may be processed locally (e.g., by processor 206) and/or transmitted to a connected device or application (e.g., via a Bluetooth or other wireless connection). For example, the tire sensors might communicate wirelessly with one or more of a vehicle's onboard computing or control systems. Alternatively, or in addition, the tire sensors might communicate with an application on, for example, a smart phone or tablet. The sensors may be selectively energized by the sensor circuitry (e.g., under the control of processor 206 via D-A converter 208 and multiplexer 210) to effect the generation of the sensor signals.

Figure 9:
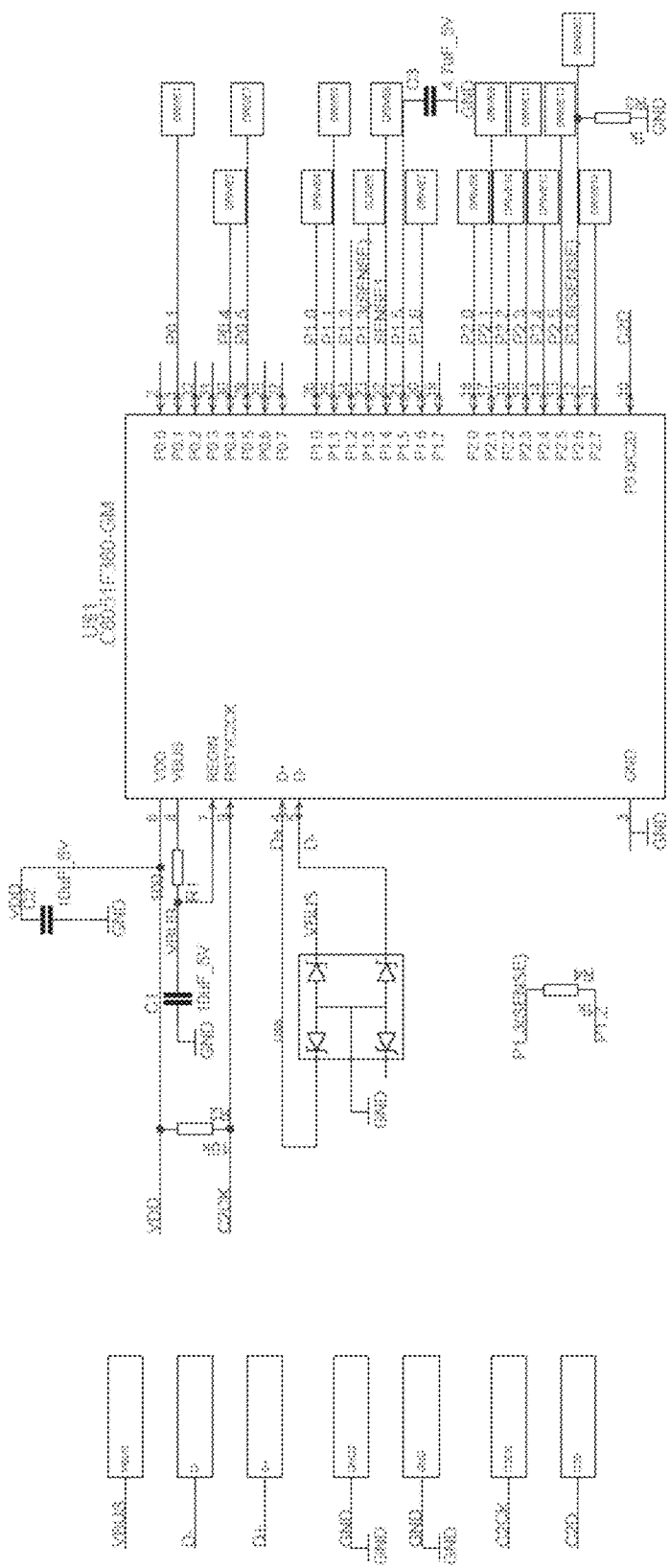
FIG. 9 is a schematic of sensor circuitry suitable for use with various implementations.

According to some implementations, power may be provided to the sensor circuitry using any of a variety of mechanisms and techniques including, for example, using one or more batteries, and/or mechanisms that harvest mechanical energy. The LTC3588 (provided by Linear Technology Corporation of Milpitas, Calif.) is an example of an energy harvesting power supply that may be used with at least some implementations. Such a chip can receive input from, for example, mechanical devices that produce energy, regulate the energy, charge batteries, etc. Other suitable variations will be appreciated by those of skill in the art. And as will be appreciated, the sensor circuitry shown in FIG. 2 is merely an example. A wide range of sensor circuitry components, configurations, and functionalities are contemplated. FIG. 9 shows a schematic diagram of a specific implementation of sensor circuitry that includes a controller which is the C8051F380-GM controller (provided by Silicon Labs of Austin, Tex.).

As automobiles and other vehicles have become increasingly instrumented, there has been a growing interest in gathering data relating to vehicle tires. However, conventional techniques for things such as tire pressure monitoring (TPM) and tread wear monitoring are still relatively rudimentary. According to various implementations enabled by the present disclosure, sensors and sensor systems are provided which may be configured to provide real-time information about forces on a vehicle tire which may be used for a variety of purposes and applications. Such applications include tire pressure monitoring and tread wear monitoring, but may also include providing information that can support a variety of other functions and systems such as, for example, anti-lock braking systems (ABS), suspension adjustment and/or control systems, wheel-drive systems, road surface determination systems, and a wide variety of other vehicle systems.

Figure 3:
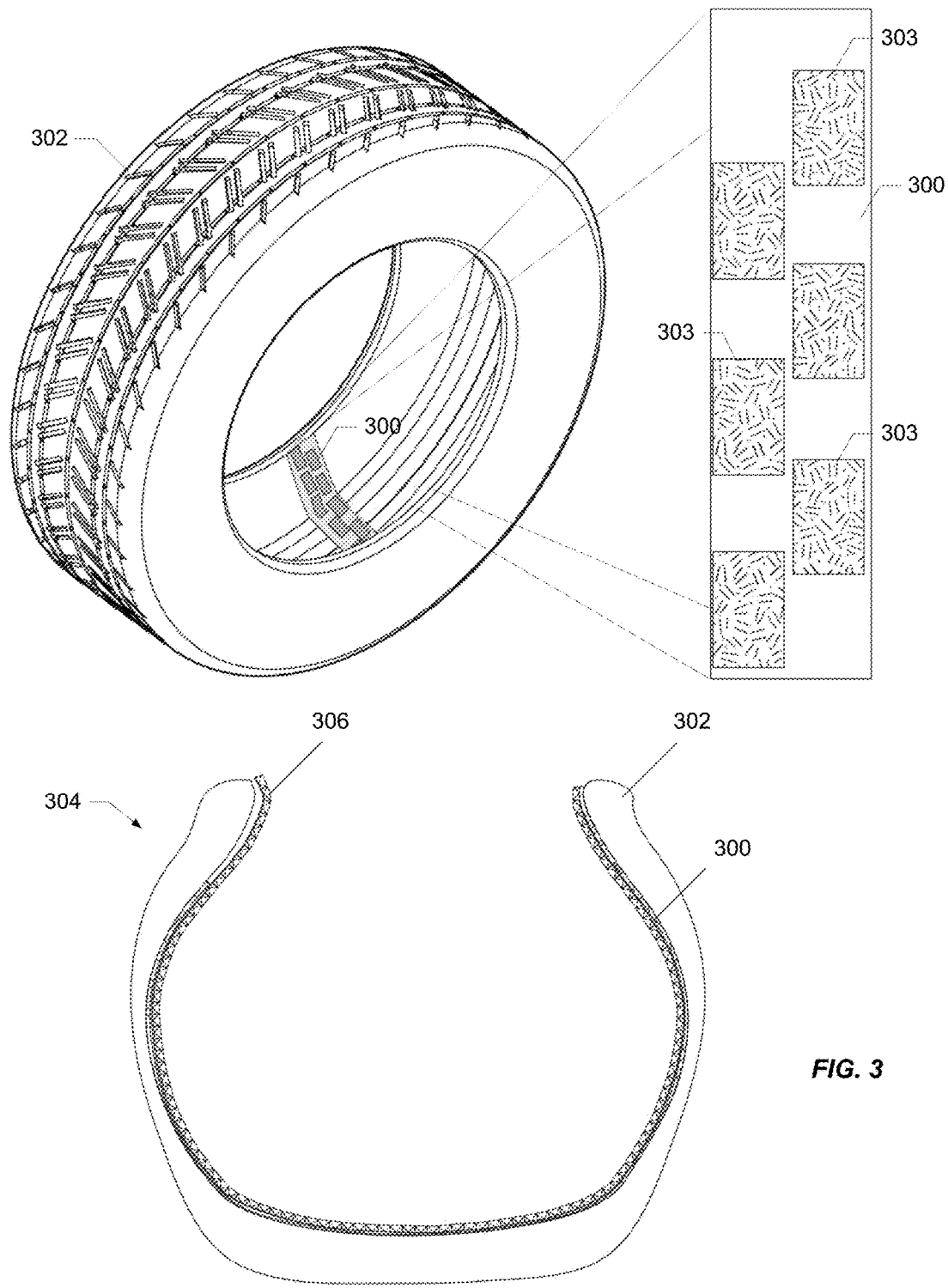
FIG. 3 is an illustration of the integration of a vehicle tire sensor system with a vehicle tire.

Such sensors and sensor systems might be implemented using, for example, one or more instances of the sensor system described above with reference to FIGS. 1 and 2. The sensors may be arranged around and/or integrated with the entire circumference and/or sidewalls of the tire. However, for certain applications it may be more efficient to align or integrate sensors with only certain portions of the tire. For example, as shown in FIG. 3, a sensor system 300 (including one or more arrays of sensors) may be integrated with a portion of a tire 302; in this case a lateral strip of sensors 303 extending from bead to bead. One way in which such a sensor system may be integrated with the tire may be understood with reference to cross-sectional view 304.

According to a particular class of implementations, sensor system 300 is mounted adjacent the inner wall or liner of tire 302. Such a configuration might be useful, for example, to generate a dynamic representation of the contour or profile of tire 302 as it changes. A normalized profile strut 306 (shown only in cross-sectional view 304) may be provided behind the sensor array to provide a mechanical reference for the sensors in the array. The stiffness of the strut may be some known percentage of the stiffness of the inflated tire to offer a suitable reference surface. Representations of forces on the tire are captured in real time by the sensor system. For example, as the tire profile compresses relative to the strut (e.g., due to tire compression), force is exerted on the sensor system and corresponding increases in the sensor output signals are measured. With a relaxation or expansion away from the normalized strut, corresponding decreases in the sensor output signals are measured. This information can be used to generate a representation of a cross-section of the tire at any point in its revolution.

For example, as tire 302 rotates, sensor system 300 detects when the corresponding portion of the tire engages with the road surface. The part of the tire that touches the road surface is commonly referred to as the "contact patch." Using the width of the sensor and the angle of rotation (e.g., as determined using an accelerometer in the tire or an encoder external to the tire), "frames" of sensor data may be acquired and processed (much like a raster scan) to generate a representation of the contact patch as well as any other area of interest. For example, measurements of the tire profile before and after the contact patch contact can provide data relating to tire stiffness which can be determined independent of temperature. In addition, data representing how quickly a tire recovers from road contact can be an indicator of tire status and integrity. Characterization of the tire profile at other locations away from the contact patch (e.g., 180 degrees, 90 degrees either direction, etc.) might also be useful in providing additional reference data for contact patch data.

Figure 4:
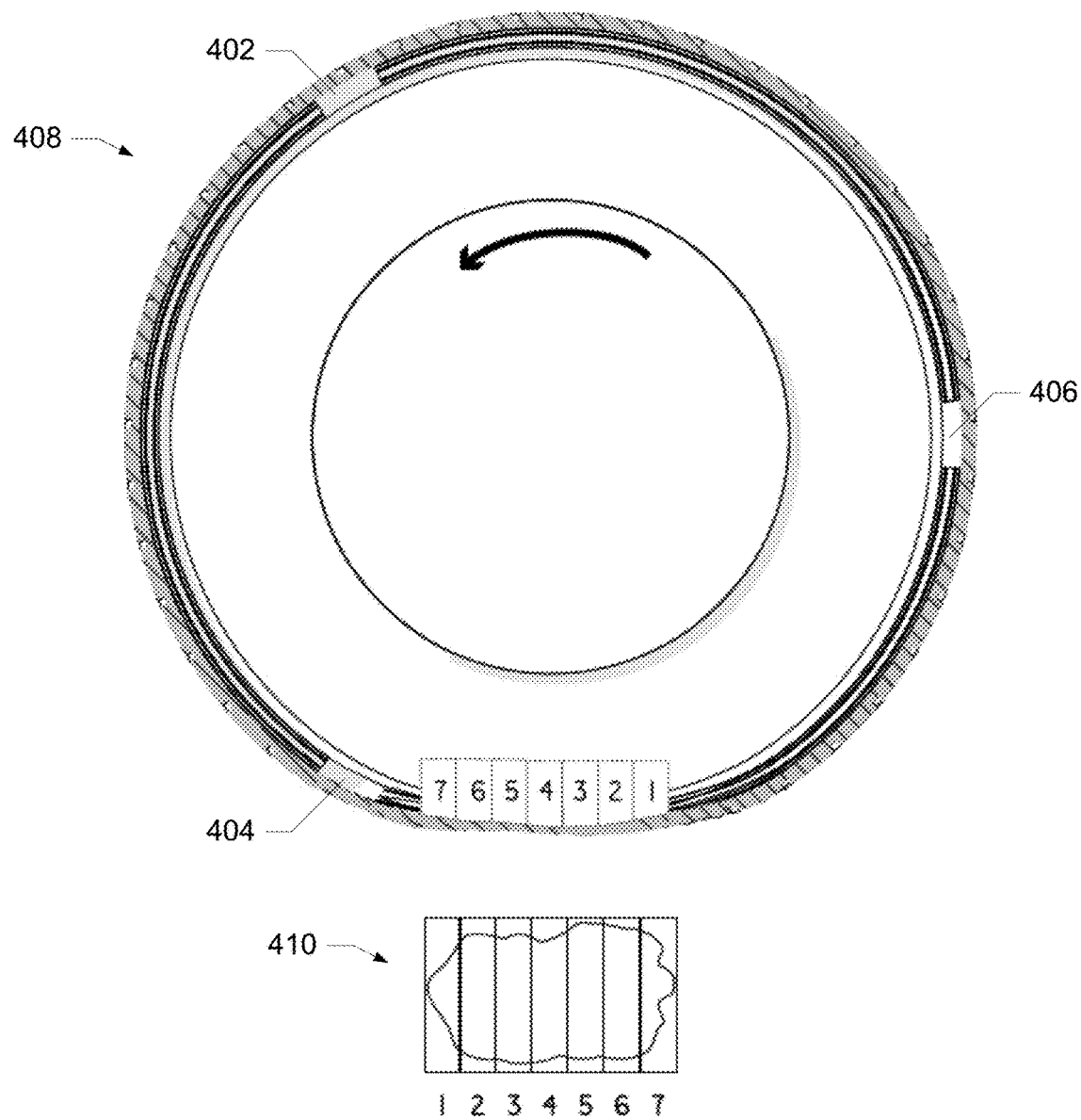
FIG. 4 is an illustration of the capture of force data by a vehicle tire sensor system.

Capturing a representation of the contact patch of a tire according to a particular implementation may be understood with reference to FIG. 4. In the depicted example, a sensor strip is shown in three positions 402, 404, and 406 arranged at 120 degree intervals around the circumference of tire 408. As the sensor strip arrives at the contact patch (e.g., as determined by corresponding changes in the sensor outputs), multiple successive data sets may be captured as the sensor strip traverses the contact patch as represented in the figure by data "frames" 1-7. Because the width of the sensor strip and the speed of rotation of the tire are known (the latter from any of a variety of suitable mechanisms) the area of the tire to which each data set corresponds can be determined, and the pressure and location information derived from each data set can be combined and used to generate a representation of the area of contact of the tire (including the distribution and magnitudes of forces) in the vicinity of the sensor strip. This is visually illustrated in FIG. 4 by contact patch 410 over the tire surface area represented by data sets 1-7.

According to some implementations, the sensor array includes bend sensors as described, for example, in U.S. patent application Ser. No. 14/671,821 referenced above and attached hereto as part of this disclosure. The bends of individual sensors could be added together to derive a representation of the tire profile. This might be accomplished using, for example, a spline, i.e., a numeric function that is piece-wise defined by polynomial functions, and which possesses a degree of smoothness at the places where the polynomial pieces (represented by the individual bend sensor data) connect.

As will be appreciated, the number and placement of the sensors can vary considerably depending on a wide variety of factors including, for example, the desired precision, resolution, and/or accuracy for a given application. A simple implementation might include only a single row of sensors. For example, a useful data set can be acquired with as few as four sensors in a single row, e.g., two adjacent the tread area and one for each of the sidewalls. However, many more might be used (up to a practical limit). Alternatively, and because an individual sensor might have a limited length or area over which it is effective, multiple rows of sensor may be employed in which the sensors of adjacent rows are offset from each other to improve coverage and/or ameliorate the effects of discontinuities between sensors. For example, the sensor array shown in FIG. 1 includes two rows of sensors that are offset from each other in the longitudinal direction of the rows by about 50% of the individual sensor size; thus providing improved coverage relative to a single row of sensors. Less overlap is demonstrated in two rows of sensors in sensor strip 300 of FIG. 3. Multiple rows of sensors might also provide redundancy that is useful in combining the contributions of individual sensors, e.g., to generate a representation of the tire profile.

The liner of a tire (typically a combination of natural and synthetic rubbers) can be a difficult surface to which to secure a sensor array implemented as described herein. In addition, some tire liners include carbon black, making the liner conductive. As will be appreciated, this may be problematic for a sensor array including conductive or partially conductive materials. Therefore, according to a particular implementation illustrated in FIG. 5, a harness 500 may be provided that includes one or more mounting locations 502 and that can be inserted into the tire mold adjacent the inflatable mold that provides the inner shape of the tire. Such a harness may be constructed from, for example, nylon or polyester; both of which are found in other parts of the tire. The harness may include two loops of cord 504 and 506; each loop having a diameter such that, when the tire mold is inflated, the harness stretches to the diameter of the inside of the tire. The loops of cord may be located at the opposing perimeters of the liner. Mounting locations 502 may be, for example, woven or molded mounting platforms that extend between the two cords. Sensor arrays enabled by the present disclosure may be mounted on the platform after integration of harness 500 with the tire during the molding and vulcanization of the tire (see cross-section view 508). As will be appreciated, mounting of the sensor array to the platform after the tire is molded avoids exposing the sensor array to the temperatures and pressures used in these processes.

Figure 5:
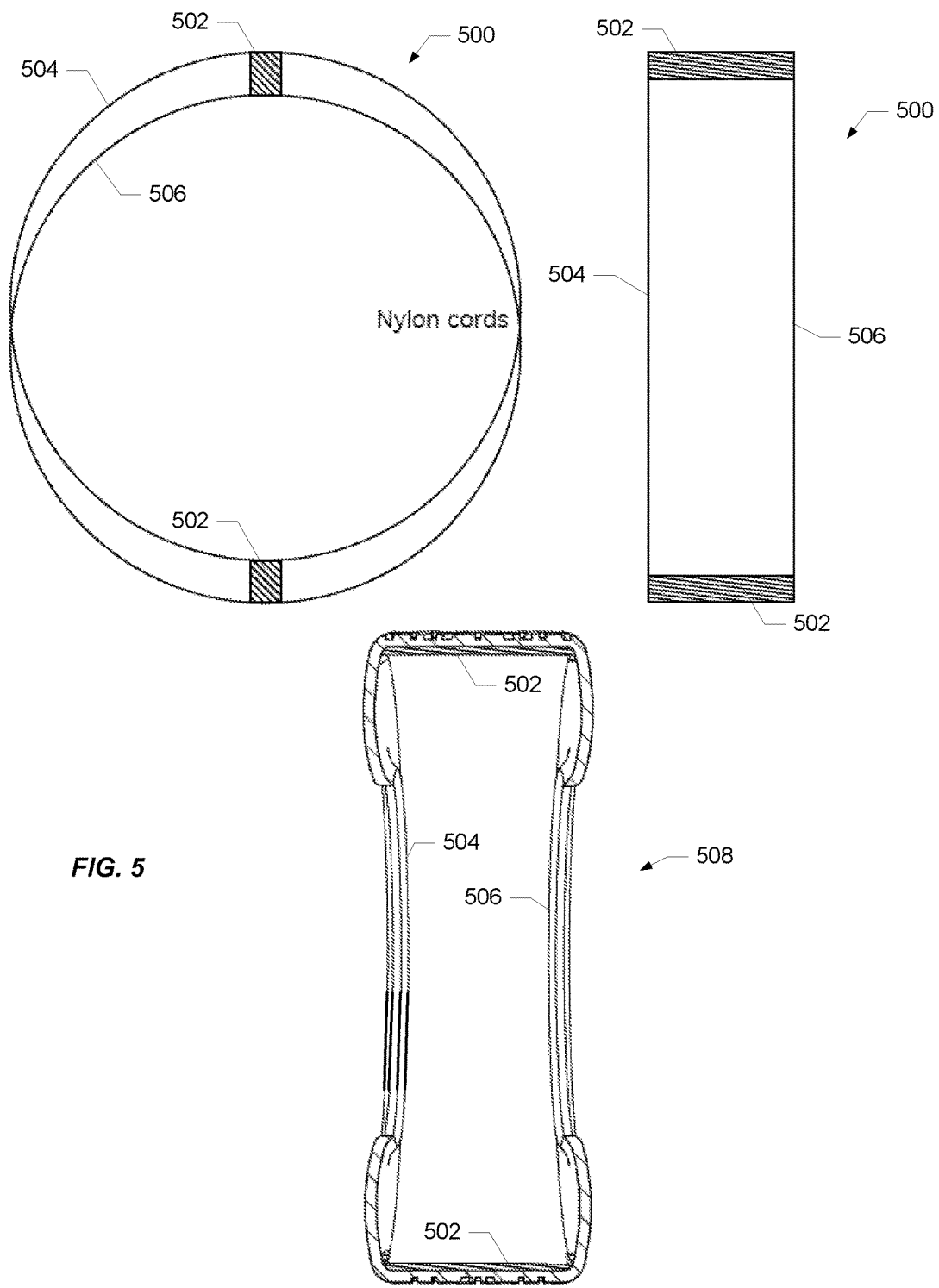
FIG. 5 is an illustration of a particular assembly for mounting a vehicle tire sensor system in a vehicle tire.

In some cases it may be necessary to mount a second platform (or something having a similar mass) opposite the mounting platform (i.e., 180 degrees around the tire as shown in FIG. 5) to provide an offsetting weight for balance of the tire. Alternatively, mounting platforms (or counterweights) may be provided at other regular intervals (e.g., 120 degrees, 90 degrees, etc.). These may include additional sensor systems or simply be for balancing of the tire. On the other hand, if the weight of the sensor system is negligible compared to other variations in tire balance, such additional platforms may not be required.

Energy harvesting generators may also be located on or near one or both of the platforms. For example, piezo-bender generators are an efficient form of mechanical energy harvesting that may be suitable for some implementations. An array of individual piezo-bender generators can be located on one or more of the platforms. As the tire deforms as it approaches and leaves the road surface the piezo-bender generators will bend, generating a voltage that can be received and regulated by an energy harvesting power supply chip, and stored in capacitors or rechargeable batteries for use by the system electronics.

Tire sensor systems enabled by the present disclosure can provide rich data sets for supporting a variety of applications, some of which may benefit from or even require the capability of correlating the sensor data with tire location. For example, in the context of tire pressure monitoring, identification of a specific tire (or even more than one tire) that is low on air would be an improvement relative to conventional solutions that typically require manual identification based on a single fault signal. In another example, if the tire sensor data are being used to support an ABS system, a suspension control system, or a wheel-drive control system, the sensor data need to be associated with the correct wheel location for proper system operation. One challenge relates to the frequent rotation of tires as recommended by tire manufacturers. That is, because the sensors described herein are integrated with the tires, changing tire locations presents an obstacle to correlating tire sensor data with tire location.

According to a particular class of implementations, techniques are provided for unambiguously correlating tire sensor data with tire location. According to a particular implementation the tire sensor systems in each tire communicate with a remote computing device or application using radio frequency (RF) links (e.g., Bluetooth links). Each of the RF transceivers has a unique identifier (e.g., a MAC address) programmed into the device for the purpose of identification. The transmitted tire sensor data may be used with vehicle turn data to determine to which tire the data belong as follows. The turn data represent left and right turns of the vehicle as determined, for example, from data generated by a global positioning system (GPS) (e.g., an onboard vehicle system or smart phone app), accelerometers, gyroscopes, or any suitable sensor or system that can be used to identify left and right turns.

Figure 6:
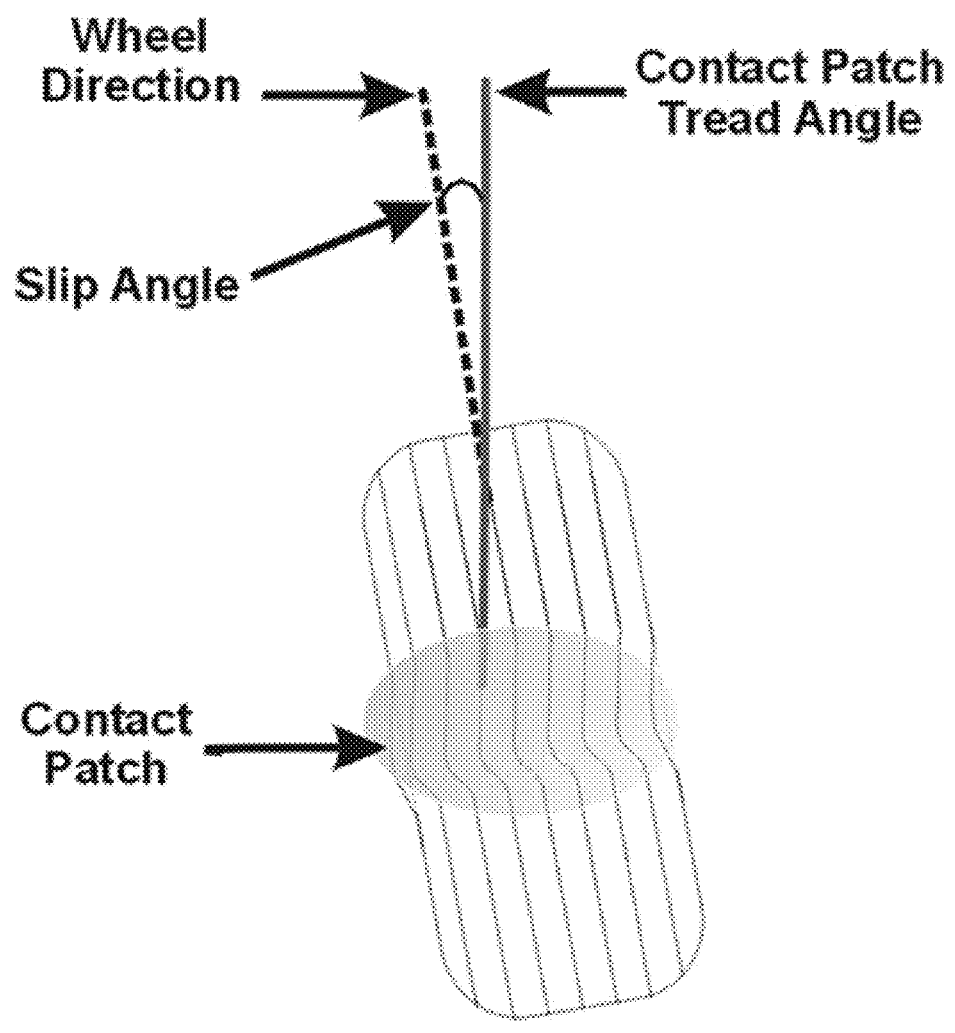
FIG. 6 is an illustration of the effect of a left turn on the contact patch of a vehicle tire.

As illustrated in FIG. 6 the forces on the contact patch of a tire reflect whether the wheel is being turned to the left or to the right. As shown, for a wheel turning left, the tread angle of the contact patch forms a "slip angle" with the direction of the wheel. As will be appreciated, the slip angle for front tires will be more than for rear tires (even for vehicles that have some amount of rear-wheel steering). And as will also be appreciated, the front tire on the outside of each turn will see forces of greater magnitude than the tire on the inside of each turn, while the outside tire will rotate more rapidly as it describes a larger arc. Thus, changes in the forces on the contact patches of each of a vehicle's tires (e.g., identified by MAC address) can be correlated with left and right turn information (e.g., derived from GPS data) to determine which tires are on the front wheels, and which front tire is on the left wheel, and which is on the right. The remaining two tires can be identified as left rear and right rear with reference to the magnitudes of the forces on each contact patch for left and right turns. Alternatively, for both front and rear tires, the left and right tires may be identified by comparing the rotational speeds of the tires in each pair. That is, the tires on opposite sides of the vehicle (whether in the front or back) will have different rotational speeds depending on the direction of a turn, with the outer tire rotating faster than the inner tire. Since we know each tire's rotational angle (either by accelerometer or encoder) we can use this information to determine which tire is rotating faster and associate this faster rotation with the outside tire to distinguish between the left and right tires. Alternatively, the rotational speed of each wheel can be derived from data from other vehicle systems.

Figure 7:
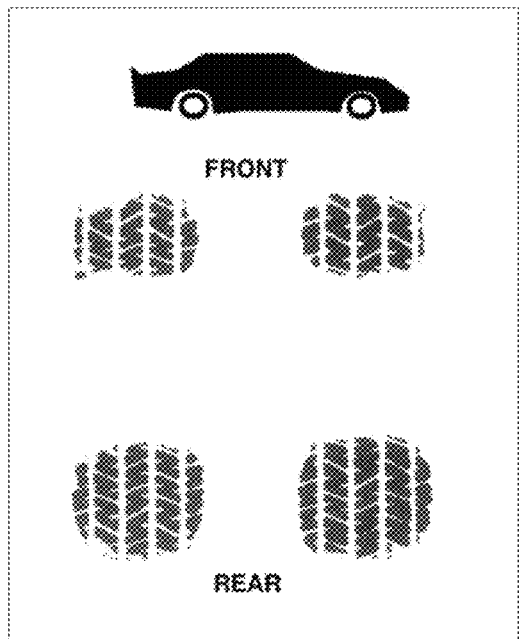
FIG. 7 includes illustrations of the effects of various vehicle actions on the contact patches of the vehicle's tires.
Figure 7:
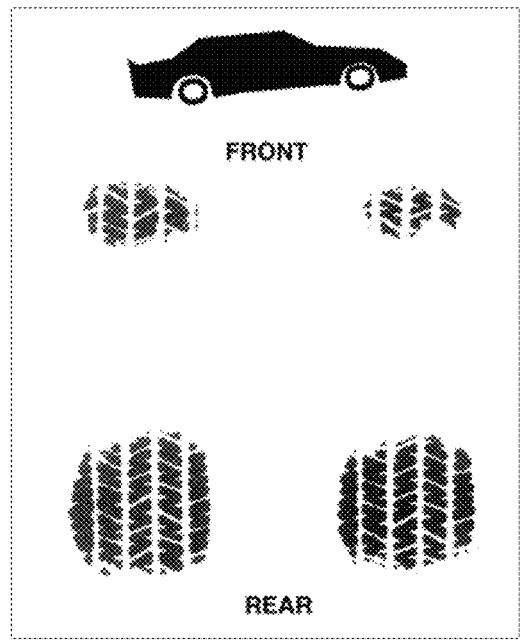
Figure 7:
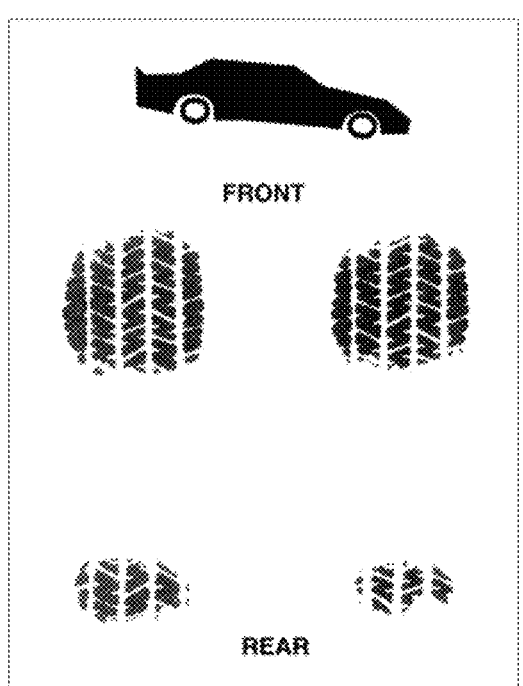
Figure 7:
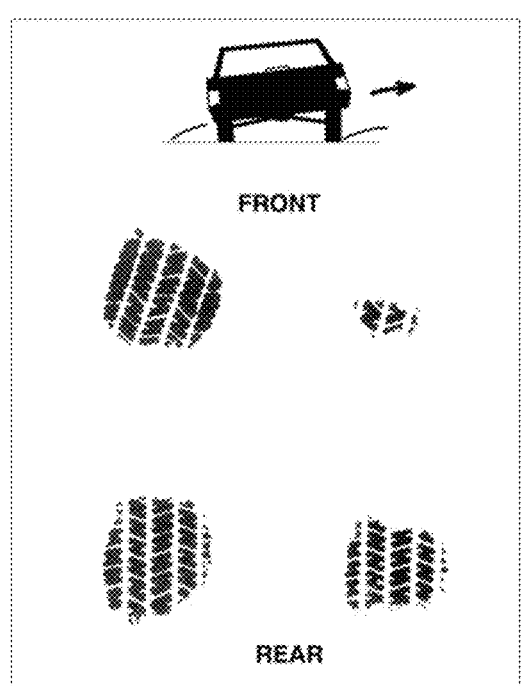

The effects on the tire contact patches of a 4-wheel vehicle for some example scenarios are illustrated in FIG. 7. As can be seen from the acceleration and deceleration/braking scenarios, the front and rear tires experience different forces that may also be used to distinguish between front and rear tires. That is, the contact patches can be correlated with periods of acceleration or deceleration as determined from other vehicle systems or other sensors (e.g., accelerometers) to make this determination. The right turn scenario in FIG. 7 also serves to illustrate the difference in forces represented by the contact patches on different sides of the vehicle during a turn.

Figure 8:
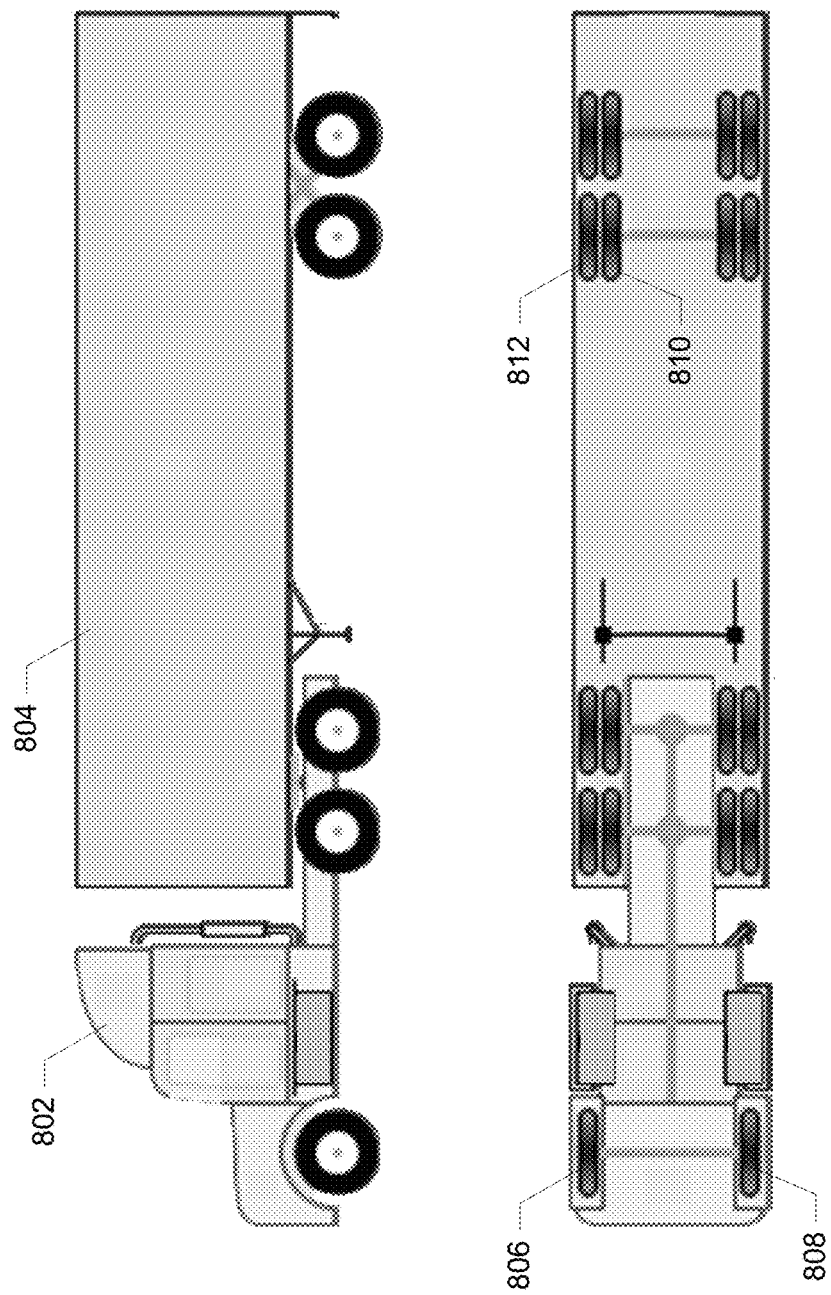
FIG. 8 is an illustration of a truck with a semi-trailer having 18 wheels.

For some vehicles, e.g., trucks that pull semi-trailers as illustrated in FIG. 8, the location problem becomes more complex as such trucks typically have multiple axles behind the front axle (e.g., two on tractor 802 and two on trailer 804 as shown in the figure), and the rear wheels often have two tires mounted to the same side of an axle, making 4 wheels per axle. As with smaller vehicles, the two front tires (806 and 808) for such trucks are used for steering, so the left and right front tires may be determined as discussed above. The 2 axles with double tires located behind the steering tires on a tractor follow the same rules that apply to a car—the outer tires in a turn will rotate more frequently since they have to travel farther.

The back 8 tires are mounted to 2 axles that also follow the above behavior, outer wheels in a turn travel farther and therefore turn more frequently. According to a particular implementation, an accelerometer in each tire or associated with each wheel detects when the truck drives over a common road feature such as, for example, a seam, brake stripes, linear cracks, etc. Because the accelerometers detect these features as they traverse them, the order of tires front to back may be determined. (Incidentally, this may be used to distinguish between front and rear tires in a 4-wheel vehicle as well).

Inner/outer tire placement can be determined by the apparent rotation direction of each detected pair, i.e., the inner tire (e.g., 810) will appear to rotate 180 degrees out of phase compared to the outer tire (e.g., 812) as the tires are mounted to the axle so that the concave tire hubs can be set to contact each other. That is, because the concave hubs of each pair are mounted to contact each other, the tires are mounted facing opposite directions so that the sensors in each report data that appear to correspond to opposite directions of rotation, e.g., the outer tire will appear to turn clockwise while the inner tire will appear to turn clockwise. Thus, it is possible to uniquely locate each of the 18 tires associated with a big rig.

As will be appreciated, any of the various types of information discussed above can be used in various combinations to improve the reliability of the tire location determination. For example, the rotational speed of a tire or wheel and the magnitudes of forces associated with the contact patches of tires may be used together to make a left/right determination. In another example, accelerometers and the magnitudes of forces associated with the contact patches may be used to make the front/rear determination. Other combinations as well as other sources of information are within the scope of the present disclosure.

And as will be appreciated from these diverse examples, the range of applications of sensor systems enabled by the present disclosure is quite broad. For example, a tire pressure monitoring system could identify an overinflated or underinflated tire by determining the length of the contact patch, e.g., an overinflated tire will have a contact patch showing a longer centerline. In another example, an ABS system may be configured to dynamically adjust braking events based on actual tire profile data that represents tire slippage or skidding. In another example, a suspension stabilization system may be configured to dynamically adjust the vehicle's suspension in response to the measurements of force on different vehicle tires. In another example, tire wear systems may be configured to measure actual tread depth. As will be appreciated with reference to the diversity of these examples, the range of possible applications of sensors and sensor systems enabled by the present disclosure is considerable.

As will be understood, the responses of the sensors in arrays enabled by the present disclosure may exhibit variation relative to each other. According to some implementations, calibrated sensor data are stored (e.g., in memory 207 of processor 206) representing the response of each of the sensors. Such data may also account for changes in individual sensor response over temperature. Calibration data can also account for variations caused by mechanical differences experienced by different sensors based on where each sensor is located in the array. Such data may be used for ensuring consistency in the way the sensor outputs are processed and/or used to represent applied forces. During calibration, the output of each sensor (e.g., as captured by ADC 204) is measured for a range of known input forces (and possibly temperatures as well). This may be done, for example, by placing each sensor on a scale, applying force to that sensor, and recording a value in memory for each of a plurality of ADC values that represents a corresponding value reported by the scale (possibly at a given temperature). In this way, a set of data points for each sensor is captured (e.g., in a table in memory 207) associating ADC values with corresponding forces (e.g., weights in grams or kilograms) as well as possibly temperatures. The data set for each sensor might capture a force value for every possible value of the ADC output and/or for very small changes in temperature. Alternatively, fewer data points may be captured and the sensor circuitry may use interpolation to derive force values for ADC outputs not represented in the data set. Variations on this theme will be understood by those of skill in the art.

Generating the set of data points for each sensor may be done by applying the force individually to each sensor using, for example, a device with a footprint that matches the sensor's active area configuration (e.g., see the shape of sensor S2 of FIG. 1). It may also be done by applying force simultaneously over multiple sensors (potentially up to the entire array) using, for example, a precision inflatable bladder that distributes force evenly over the set of sensors. The measurements for a given force can then be captured by activating the sensors sequentially. Other variations will be appreciated by those of skill in the art. Regardless of how the calibration force is applied, what results is data set that the processor may use to map the output received from each sensor to an accurate representation of the force represented. As will be appreciated, this consistency of representation may be important for some applications.

For some applications, it may also be important to account for crosstalk among the sensors of an array. Crosstalk refers to contributions to a particular sensor's output attributable to other resistive components of the array in parallel with the resistance of the sensor of interest; often referred to as parasitic resistances. According to some implementations, the capture of a sensor's output is accomplished through the use of an analog-to-digital converter (ADC) that compares the input to a stable reference and generates an ADC Count given by:

$$\text{Count} = ADC_{max} * \left( \frac{(V_+ - V_-)}{V_{ref}} \right)$$

where $V_+ - V_-$ represents the ADC input voltage from the sensor ($V_{in}$), and $V_{ref}$ the ADC's reference. According to a particular class of implementations, it is possible to more accurately determine the value of the resistance of interest by taking multiple measurements for the sensor and combining the measurements mathematically in a way that allows for solving for the resistance of interest.

According to one such implementation, one measurement, V1, is taken with the drive signal of the sensor of interest driven high and the drive signals of all of the other sensors driven low. A second measurement, V2, is taken with the drive signal of the sensor of interest driven low and the drive signals of the other sensors driven high. Equations for V1 and V2 may be written as follows:

$$V1 = 3.3 \text{ V}\left(\frac{R?\|Rp}{R? + R\|Rp}\right)$$

$$V2 = 3.3 \text{ V}\left(\frac{R\|Rp}{R + R?\|Rp}\right)$$

where R represents the resistance of the sensor of interest, R? represents the resistance of the other resistive components of the array contributing to the measurement, Rp represents the other resistor of the sensor's voltage divider, and 3.3V represents the reference voltage of the ADC. Using substitution, we can find an equation for V1 in terms of V2 (or vice-versa), eliminating the dependence on R? as follows:

$$V1 = Rp\left(\frac{3.3 \text{ V} - V2}{R + Rp}\right)$$

$$V2 = 3.3 \text{ V} - \frac{V1(R + Rp)}{Rp}$$

Solving either of these equations for R yields:

$$R = Rp\left(\frac{3.3 \text{ V} - V2}{V1} - 1\right)$$

And since the measurements of V1 and V2 are in units of ADC Counts, we can choose Vref=Vin=3.3V such that the processor can determine R, the resistance of the sensor of interest, as follows:

$$R = Rp\left(\frac{ADC_{max} - Count_{V2}}{Count_{V1}} - 1\right)$$

A more accurate determination of R allows for a more accurate determination of the force applied to the sensor of interest (e.g., using R as an index into a table of resistance vs. force values).

Modifications to this approach might be useful for some applications in which it is desirable to reduce the amount of time required to complete the measurements and calculations for each sensor. For example, V2 can be measured without driving the signal line for the sensor of interest low, in which case it can be shown that R, the resistance of the sensor of interest, is given by:

$$R = Rp\left(\frac{ADC_{max} - Count_{V2}}{Count_{V1}}\right)$$

This requires fewer instructions/operations by the processor and may be advantageous for applications using higher sample rates. Other variations of these approaches may be apparent to those of skill in the art.

It will be understood by those skilled in the art that changes in the form and details of the implementations described herein may be made without departing from the scope of this disclosure. For example, implementations have been described herein in which conductive traces are formed directly on or otherwise integrated with a flexible piezoresistive substrate to form various types of sensor systems. However, the scope of this disclosure is not so limited. That is, it should be noted that implementations are contemplated in which some or even all of the conductive traces of a sensor system enabled by the present disclosure may not be formed directly on a flexible piezoresistive substrate, but instead are formed on another substrate that is placed adjacent a piezoresistive substrate. For example, the conductive traces forming a sensor array may be formed on a non-conductive or low conductivity substrate (e.g., a fabric or rubber with dielectric properties) which is placed in contact with a flexible piezoresistive substrate in a multi-layer structure such that the conductive traces are in contact with the piezoresistive substrate. As will be appreciated by those of skill in the art, such an arrangement may function in a manner similar to sensor systems in which the conductive traces are formed directly on the piezoresistive substrate.

Finally, although various advantages and aspects may have been described with reference to particular implementations, the scope of this disclosure should not be limited by reference to such advantages and aspects.

What is claimed is:

1. A sensor system for use with a vehicle tire, comprising:
   a flexible piezoresistive substrate; and
   an array of sensors, each sensor including at least two conductive traces formed directly on the piezoresistive substrate, each sensor being positioned on the piezoresistive substrate to align with a region of the vehicle tire, wherein resistance between the conductive traces varies with force applied to the piezoresistive substrate; and
   sensor circuitry configured to receive sensor signals from the array of sensors, each sensor signal representing a force associated with a corresponding one of the sensors, the sensor circuitry being further configured to generate sensor data from the sensor signals, the sensor data comprising a representation of a contact patch of the vehicle tire, the contact patch representing a distribution and magnitudes of the forces associated with the array of sensors;
   wherein the sensor system is configured to conform to an interior of the vehicle tire.

2. The sensor system of claim 1, wherein the sensor circuitry is further configured to selectively energize the sensors to generate the sensor signals.

3. The sensor system of claim 1, wherein the sensor circuitry is disposed on a printed circuit board that is integrated with the piezoresistive substrate.

4. The sensor system of claim 1, wherein the sensor circuitry is further configured to process the sensor signals corresponding to multiple sensors in the array of sensors to determine a speed and direction of the force.

5. The sensor system of claim 1, wherein the conductive traces comprise conductive ink printed on the piezoresistive substrate.

6. The sensor system of claim 5, wherein the conductive ink comprises a silicone ink having conductive particles suspended therein.

7. The sensor system of claim 1, wherein the conductive traces comprise conductive paint deposited on the piezoresistive substrate.

8. The sensor system of claim 1, wherein the sensor circuitry is configured to generate control information from the sensor signals, the control information being for use by a tire pressure monitoring system, a tread wear monitoring system, an anti-lock braking system, a suspension adjustment and/or control system, a wheel-drive system, or a road surface determination system.

9. A vehicle tire including the sensor system of claim 1.

10. The vehicle tire of claim 9, wherein the vehicle tire comprises a plurality of layers, a first one of the layers including the piezoresistive substrate and sensor array.

11. The vehicle tire of claim 9, further comprising a mounting platform integrated with an inner surface of the tire during vulcanization of the tire, the sensor system being mounted on the mounting platform after vulcanization of the tire.

12. The sensor system of claim 1, wherein the piezoresistive substrate is a piezoresistive fabric.

13. The sensor system of claim 12, wherein the piezoresistive fabric is woven or non-woven.

14. The sensor system of claim 1, wherein the piezoresistive substrate is a piezoresistive rubber.

15. A sensor system for use with a vehicle tire, comprising:
piezoresistive material;
a dielectric substrate aligned and in contact with the piezoresistive material; and
an array of sensors, each sensor including at least two conductive traces formed directly on the dielectric substrate such that the conductive traces are in contact with the piezoresistive material, each sensor being positioned on the dielectric substrate to align with a region of the vehicle tire, wherein resistance between the conductive traces varies with force applied to the piezoresistive material; and
sensor circuitry configured to receive sensor signals from the array of sensors, each sensor signal representing a force associated with a corresponding one of the sensors, the sensor circuitry being further configured to generate sensor data from the sensor signals, the sensor data comprising a representation of a contact patch of the vehicle tire, the contact patch representing a distribution and magnitudes of the forces associated with the array of sensors;
wherein the sensor system is configured to conform to an interior of the vehicle tire.

16. The sensor system of claim 15, wherein the piezoresistive material is a continuous flexible substrate.

17. The sensor system of claim 15, wherein the piezoresistive material is a plurality of patches of piezoresistive material, each patch of the piezoresistive material being aligned with one or more of the sensors.

18. The sensor system of claim 15, wherein the sensor circuitry is further configured to selectively energize the sensors to generate the sensor signals.

19. The sensor system of claim 15, wherein the sensor circuitry is disposed on a printed circuit board that is integrated with the dielectric substrate.

20. The sensor system of claim 15, wherein the sensor circuitry is further configured to process the sensor signals corresponding to multiple sensors in the array of sensors to determine a speed and direction of the force.

21. The sensor system of claim 15, wherein the conductive traces comprise conductive ink printed on the dielectric substrate.

22. The sensor system of claim 21, wherein the conductive ink comprises a silicone ink having conductive particles suspended therein.

23. The sensor system of claim 15, wherein the conductive traces comprise conductive paint deposited on the dielectric substrate.

24. The sensor system of claim 15, wherein the sensor circuitry is configured to generate control information from the sensor signals, the control information being for use by a tire pressure monitoring system, a tread wear monitoring system, an anti-lock braking system, a suspension adjustment and/or control system, a wheel-drive system, or a road surface determination system.

25. A vehicle tire including the sensor system of claim 15.

26. The vehicle tire of claim 25, wherein the vehicle tire comprises a plurality of layers, a first one of the layers including the array of sensors.

27. The vehicle tire of claim 25, further comprising a mounting platform integrated with an inner surface of the tire during vulcanization of the tire, the sensor system being mounted on the mounting platform after vulcanization of the tire.

28. The sensor system of claim 15, wherein the piezoresistive material is a piezoresistive fabric.

29. The sensor system of claim 28, wherein the piezoresistive fabric is woven or non-woven.

30. The sensor system of claim 15, wherein the piezoresistive material is a piezoresistive rubber.

* * * * *